United States Patent
Matsuoka et al.

(10) Patent No.: US 12,441,263 B2
(45) Date of Patent: Oct. 14, 2025

(54) IN-VEHICLE IMAGING DEVICE AND NON-TRANSITORY COMPUTER-READABLE STORAGE MEDIUM STORING A PROGRAM

(71) Applicant: JVCKENWOOD Corporation, Yokohama (JP)

(72) Inventors: Tomohiro Matsuoka, Yokohama (JP); Fumihiko Yokoyama, Yokohama (JP); Takeshi Kuchinomachi, Yokohama (JP); Yasuo Sugita, Yokohama (JP); Yoshiharu Koji, Yokohama (JP); Manabu Karasawa, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 86 days.

(21) Appl. No.: 18/383,432

(22) Filed: Oct. 24, 2023

(65) Prior Publication Data

US 2024/0051484 A1 Feb. 15, 2024

Related U.S. Application Data

(63) Continuation of application No. PCT/JP2022/014649, filed on Mar. 25, 2022.

(30) Foreign Application Priority Data

Apr. 26, 2021 (JP) ................... 2021-074105
Apr. 26, 2021 (JP) ................... 2021-074106

(51) Int. Cl.
*B60R 21/00* (2006.01)
*G08B 25/10* (2006.01)
*H04M 1/72409* (2021.01)

(52) U.S. Cl.
CPC .............. *B60R 21/00* (2013.01); *G08B 25/10* (2013.01); *H04M 1/724098* (2022.02); *B60R 2021/0027* (2013.01)

(58) Field of Classification Search
None
See application file for complete search history.

(56) References Cited

U.S. PATENT DOCUMENTS 6,400,941 B1 * 6/2002 Nara ................ H04W 4/02
455/552.1
9,457,754 B1 * 10/2016 Christensen ........... G08G 1/205
(Continued)

FOREIGN PATENT DOCUMENTS

| CN | 111605556 A | 9/2020 |
|---|---|---|
| JP | 2001-202579 A | 7/2001 |
| KR | 10-2010-0083022 A | 7/2010 |

*Primary Examiner* — Daniel Previl
(74) *Attorney, Agent, or Firm* — PROCOPIO, CORY, HARGREAVES & SAVITCH LLP

(57) ABSTRACT

An in-vehicle imaging device includes an impact detecting unit configured to detect an impact on a vehicle, a connection processing unit configured to connect to a first phone contact when the impact detected by the impact detecting unit is equal to or greater than a predetermined magnitude and to set a second phone contact as a destination of a connection when the impact is less than the predetermined magnitude, and an operation detecting unit configured to detect a user's operation. The connection processing unit connects to the second phone contact when the impact is less than the predetermined magnitude and the operation detecting unit detects an operation for connecting to a phone contact.

14 Claims, 13 Drawing Sheets

(56) References Cited

U.S. PATENT DOCUMENTS

| | | | | |
|---|---|---|---|---|
| 2003/0233261 A1* | 12/2003 | Kawahara | ............... | G06Q 40/08 |
| | | | | 705/4 |
| 2010/0202368 A1* | 8/2010 | Hans | ..................... | H04W 4/90 |
| | | | | 370/352 |
| 2020/0302782 A1* | 9/2020 | Iwaki | ..................... | G06V 20/56 |
| 2021/0253099 A1* | 8/2021 | Gotoh | ................. | B60W 30/146 |

* cited by examiner

IN-VEHICLE IMAGING DEVICE AND NON-TRANSITORY COMPUTER-READABLE STORAGE MEDIUM STORING A PROGRAM

CROSS REFERENCE TO RELATED APPLICATION

PRIORITY IS CLAIMED ON JAPANESE PATENT APPLICATION NO. 2021-074105, FILED Apr. 26, 2021 AND JAPANESE PATENT APPLICATION NO. 2021-074106, FILED Apr. 26, 2021, THE CONTENT OF WHICH IS INCORPORATED HEREIN BY REFERENCE.

TECHNICAL FIELD

The present invention relates to an in-vehicle imaging device and a non-transitory computer-readable storage medium storing a program.

BACKGROUND

An in-vehicle imaging device such as a drive recorder having a function of notifying a call center when an accident has occurred is known. An in-vehicle imaging device having a function of notifying a call center when a call button is pressed is known. When a call button is pressed, the urgency of an accident or the like is considered to be low.

As a technique of transmitting emergency information to the outside when an emergency such as an accident occurs while driving a vehicle, a technique of enabling transmission of emergency information even in a situation in which a transmission switch cannot be pressed is known (for example, see Patent Document 1).

CITATION LIST

Patent Document

[Patent Document 1]
Japanese Unexamined Patent Application, First Publication No. 2001-202579

SUMMARY

It is conceivable that a call center to which a call is made when an accident occurs and a call center to which a call is made when a call button is pressed be the same. In this case, since a large number of calls are given to the same call center, connection to the call center may not be achieved due to coping with other persons even when a person needing to make a call calls the call center. Since calls are made to the same call center, a burden on the call center may become heavy.

Since inquiry details may be different according to whether an accident has occurred or an accident has rot occurred, the call center may have difficulty coping with connections to the call center.

According to an embodiment of the invention, there is provided an in-vehicle imaging device including: an impact detecting unit configured to detect an impact on a vehicle; a connection processing unit configured to connect to a first phone contact when the impact detected by the impact detecting unit is equal to or greater than a predetermined magnitude and to set a second phone contact as a destination of a connection when the impact is less than the predetermined magnitude; and an operation detecting unit configured to detect a user's operation, wherein the connection processing unit connects to the second phone contact when the impact is less than the predetermined magnitude and the operation detecting unit detects an operation for connecting to a phone contact.

According to another embodiment of the present invention, there is provided a non-transitory computer-readable storage medium storing a program causing a computer to perform: a step of detecting an impact on a vehicle; and a step of connecting to a first phone contact when the detected impact is equal to or greater than a predetermined magnitude and connecting to a second phone contact when the impact is less than the predetermined magnitude and an operation for connecting to a phone contact has been detected.

According to another embodiment of the present invention, there is provided an in-vehicle imaging device including: an impact detecting unit configured to detect an impact on a vehicle; a connection processing unit configured to connect to a phone contact with a first priority when the impact detected by the impact detecting unit is equal to or greater than a predetermined magnitude and to connect to the phone contact with a second priority when the impact is less than the predetermined magnitude; and an operation detecting unit configured to detect a user's operation, wherein the connection processing unit connects to the phone contact with the second priority when the operation detecting unit detects an operation for connecting to a phone contact.

According to another embodiment of the present invention, there is provided a non-transitory computer-readable storage medium storing a program causing a computer to perform: a step of detecting an impact on a vehicle; and a step of connecting to a phone contact with a first priority when the detected impact is equal to or greater than a predetermined magnitude and connecting to the phone contact with a second priority when the impact is less than the predetermined magnitude and an operation for connecting to a phone contact has been detected.

According to the embodiment, it is possible to improve convenience when a call is made to a phone contact such as a call center.

DETAILED DESCRIPTION

Figure 1:
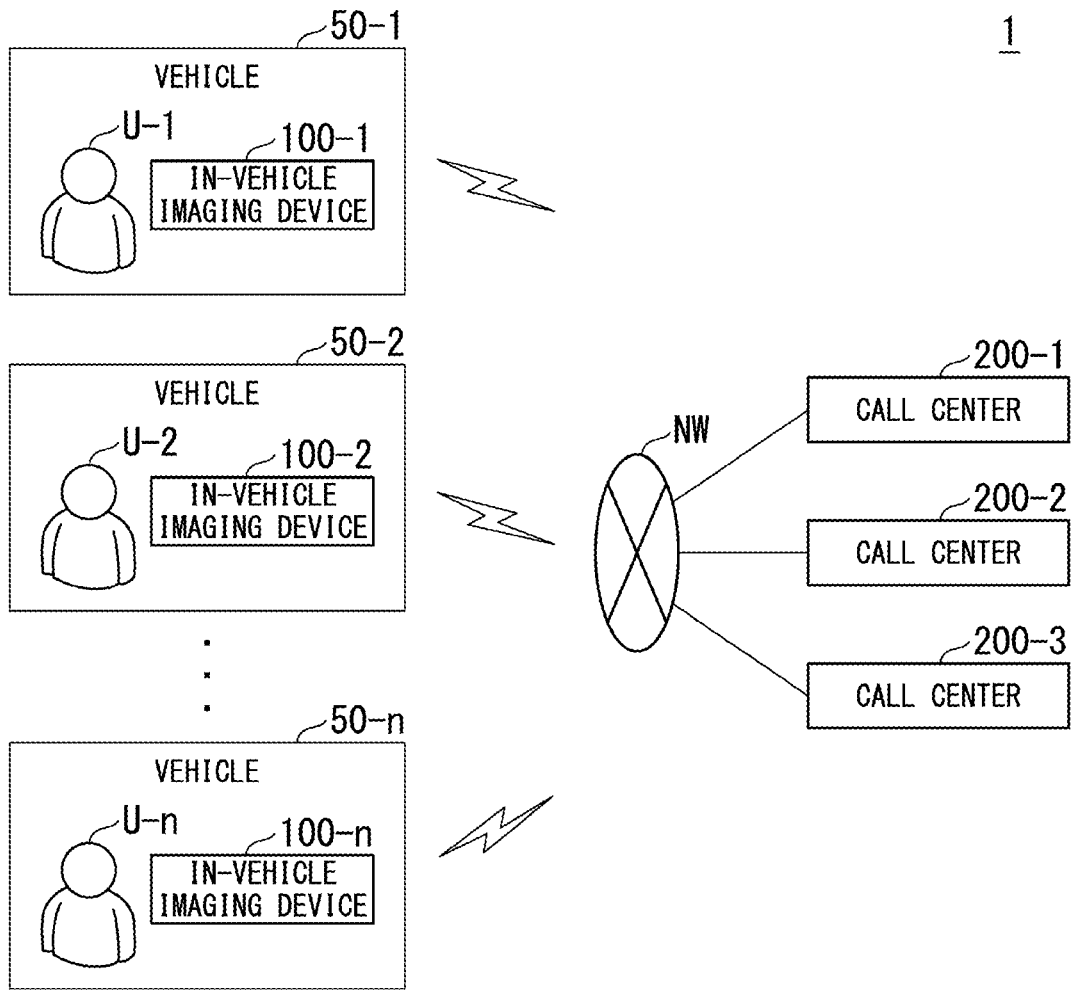
FIG. 1 is a diagram illustrating an example of a configuration of an information processing system according to a first embodiment of the present invention.

An in-vehicle imaging device and a non-transitory computer-readable storage medium storing a program according to embodiments of the present invention will be described below with reference to the accompanying drawings. The embodiments described below are only examples and an embodiment to which the present invention is applied is not limited to the following embodiments.

In the drawings illustrating the embodiments, elements having the same functions will be referred to by the same reference signs and repeated description thereof will be omitted.

"On the basis of XX" mentioned in this specification means "on the basis of at least XX" and includes "on the basis of another element in addition to XX." "On the basis of XX" is not limited to direct use of XX and includes use of results obtained by performing calculation or processing on XX. "XX" is an arbitrary factor (for example, arbitrary information).

First Embodiment (Information Processing System)

FIG. 1 is a diagram illustrating an example of a configuration of an information processing system according to a first embodiment of the present invention. In FIG. 1, an information processing system 1 includes an in-vehicle imaging device 100-1, an in-vehicle imaging device 100-2, . . . , an in-vehicle imaging device 100-$n$ (where n is an integer satisfying n>0), a call center 200-1, a call center 200-2, and a call center 200-3.

The in-vehicle imaging device 100-1, the in-vehicle imaging device 100-2, . . . , the in-vehicle imaging device 100-$n$, the call center 200-1, the call center 200-2, and the call center 200-3 communicate with each other via a network NW.

The network NW includes, for example, a wide area network (WAN), a local area network (LAN), a provider device, or a wireless base station.

The in-vehicle imaging device 100-1 is mounted in a vehicle 50-1. The in-vehicle imaging device 100-1 is used by a user U-1. The in-vehicle imaging device 100-2 is mounted in a vehicle 50-2. The in-vehicle imaging device 100-2 is used by a user U-2. The in-vehicle imaging device 100-$n$ is mounted in a vehicle 50-$n$. The in-vehicle imaging device 100-$n$ is used by a user U-n.

In the following description, an arbitrary vehicle out of the vehicles 50-1 to 50-$n$ is referred to as a vehicle 50. An arbitrary in-vehicle imaging device out of the in-vehicle imaging devices 100-1 to 100-$n$ is referred to as an in-vehicle imaging device 100, and a user using the in-vehicle imaging device 1M is referred to as a user U.

The in-vehicle imaging device 100 images the surroundings of the vehicle 50 in which the in-vehicle imaging device 100 is mounted. When an impact on the vehicle 50 is detected, the in-vehicle imaging device 100 connects to the call center 200-1 which is a first phone contact when the impact is equal to or greater than a predetermined magnitude and connects to the call center 200-2 which is a second phone contact when the impact is less than the predetermined magnitude. Here, the in-vehicle imaging device 100 connects to the call center 200-2 when an operation of the user U for connecting to a phone contact is detected.

When a road-rage vehicle traveling near the vehicle 50 within a predetermined inter-vehicle distance for a predetermined time or more is detected, the in-vehicle imaging device 100 connects to the call center 200-3 which is a third phone contact. The in-vehicle imaging device 100 connects to the call center 200-3 when the operation of the user U for connecting to a phone contact is detected. The in-vehicle imaging device 100 may connect to a call center 200-4 which is a fourth phone contact when the operation of the user U for connecting to a phone contact is detected and a road-rage vehicle near the vehicle 50 is not detected.

The in-vehicle imaging device 100 included in the information processing system 1 will be described below.

(In-Vehicle Imaging Device 100)

Figure 2:
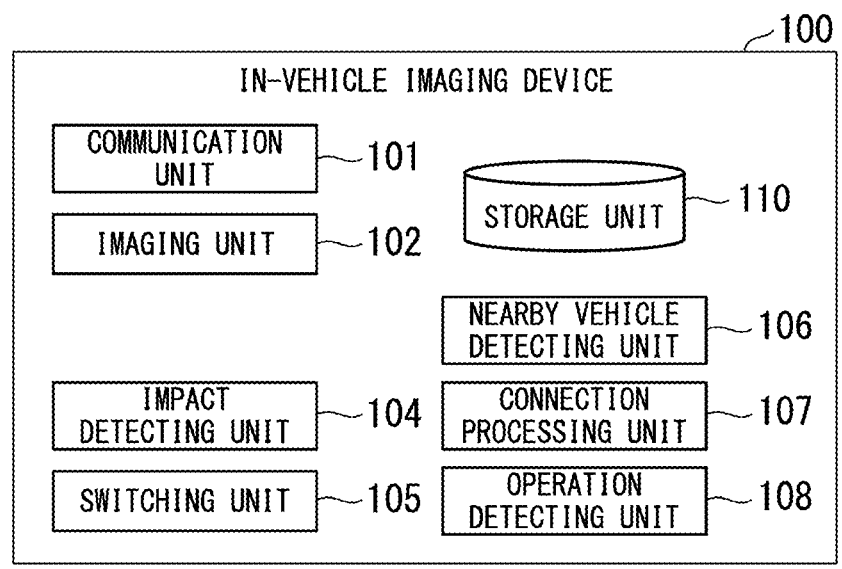
FIG. 2 is a diagram illustrating an example of a configuration of an in-vehicle imaging device according to the first embodiment.

FIG. 2 is a diagram illustrating an example of a configuration of an in-vehicle imaging device according to this embodiment.

The in-vehicle imaging device 100 includes a communication unit 101, an imaging unit 102, an impact detecting unit 104, a switching unit 105, a nearby vehicle detecting unit 106, a connection processing unit 107, an operation detecting unit 108, and a storage unit 110.

An example of the in-vehicle imaging device 100 is a drive recorder. The in-vehicle imaging device 100 is an onboard image recording device. The in-vehicle imaging device 100 is installed in a vehicle 50 mainly for the purpose of recording a situation in which a vehicle accident occurs. The in-vehicle imaging device 100 records a situation inside or outside of the vehicle using the imaging unit 102 attached to a front windshield or a dashboard.

The communication unit 101 is realized by a communication module. The communication unit 101 communicates with external communication devices such as the call centers 200-1 to 200-3 via the network NW. The communication unit 101 may perform communication using a mobile communication system such as Long-Term Evolution (LTE) (registered trademark) or a wireless communication system such as wireless LAN. The communication unit 101 communicates with the call center 200-1, the call center 200-2, and the call center 200-3.

The imaging unit 102 acquires an image using an imaging element such as a charge coupled device (CCD) or a complementary MOS (CMOS). For example, the imaging unit 102 includes a lens, an iris control mechanism, a shutter speed control mechanism, and a focus control mechanism to adjust input light. The imaging unit 102 includes a gain control mechanism such as an amplifier and an A/D converter to adjust electrical characteristics of imaging elements. The imaging unit 102 includes an output I/F and a timing generator for cooperation with constituents. The imaging unit 102 outputs image data to the nearby vehicle detecting unit 106.

The storage unit 110 is realized by a hard disk drive (HDD), a flash memory, a random-access memory (RAM), a read-only memory (ROM), or the like. The storage unit 110 acquires image data output from the nearby vehicle detecting unit 106 and stores the acquired image data.

The impact detecting unit 104 acquires impact information. The impact detecting unit 104 acquires information indicating an impact detected by an impact sensor (not illustrated). An example of the impact sensor is an acceleration sensor and is mounted in the in-vehicle imaging device 100. In the following description, it is assumed that the impact sensor is constituted by an acceleration sensor. The impact sensor acquires information indicating acceleration. The impact sensor prepares impact information including the acquired information indicating acceleration and output the prepared impact information to the impact detecting unit 104.

The impact detecting unit 104 determines whether an intermediate impact has been detected or whether a big impact has been detected on the basis of the information indicating acceleration which is included in the acquired impact information. When the acceleration is equal to or higher than a first acceleration threshold value and less than a second acceleration threshold value (first acceleration threshold value≤acceleration<second acceleration threshold value), the impact detecting unit 104 determines that an intermediate impact has been detected and prepares impact detection information including information indicating that an intermediate impact has been detected. When the acceleration is equal to or higher than the second acceleration threshold value (second acceleration threshold value s acceleration), the impact detecting unit 104 determines that a big impact has been detected and prepares impact detection information including information indicating that a big impact has been detected. The impact detecting unit 104 outputs the prepared impact detection information to the switching unit 105. An example of the first acceleration threshold value is 3G, and an example of the second acceleration threshold value is 50. This is an example and the acceleration threshold values are not limited thereto.

The switching unit 105 switches a phone contact among the call centers 200-1 to 200-3. The switching unit 105 normally sets the call center 200-1 as a phone contact for the connection processing unit 107. The switching unit 105 acquires the impact detection information output from the impact detecting unit 104. When information indicating that an intermediate impact has been detected is included in the acquired impact detection information, the switching unit 105 prepares a switching request for requesting the connection processing unit 107 to switch the phone contact to the call center 200-2 and outputs the prepared switching request to the connection processing unit 107. When information indicating that a big impact has been detected is included in the acquired impact detection information, the switching unit 105 outputs a call request to the connection processing unit 107.

The nearby vehicle detecting unit 106 acquires image data output from the imaging unit 102 and detects a vehicle near the vehicle 50 by processing the acquired image data. When a vehicle near the vehicle 50 is detected, the nearby vehicle detecting unit 106 determines whether the nearby vehicle is a road-rage vehicle which has been traveling at an inter-vehicle distance less than a predetermined distance near the vehicle 50 for a predetermined time or more. When a vehicle corresponding to a road-rage vehicle is detected, the nearby vehicle detecting unit 106 stores the image data in the storage unit 110 and prepares dangerous vehicle detection information including information indicating that a vehicle corresponding to a road-rage vehicle has been detected. The nearby vehicle detecting unit 106 outputs the prepared dangerous vehicle detection information to the switching unit 105.

Road rage includes violation of traffic division, violation of quick braking prohibition, shortage of inter-vehicle distance, violation of lane change prohibition, overtake violation, violation of extinction or the like, violation of horn use restriction, safe driving violation, violation of minimum speed (national expressway), and parking violation in national expressway. For example, a meandering vehicle which is meandering near the vehicle 50 corresponds to safe driving violation.

The switching unit 105 acquires the dangerous vehicle detection information output from the nearby vehicle detecting unit 106. The switching unit 105 prepares a switching request for requesting the connection processing unit 107 to switch the phone contact to the call center 200-3 on the basis of the acquired dangerous vehicle detection information and outputs the prepared switching request to the connection processing unit 107.

The connection processing unit 107 acquires the switching request output from the switching unit 105 and sets the phone contact to a phone contact indicated by the switching request on the basis of the acquired switching request. When a connection request output from the switching unit 105 is acquired in a state in which the switching request has not been acquired, the connection processing unit 107 prepares a call request with the set first phone contact (the call center 200-1) as a destination. The connection processing unit 107 outputs the prepared call request to the communication unit 101. The communication unit 101 acquires the call request output from the connection processing unit 107 and transmits the acquired call request to the call center 200-1.

The operation detecting unit 108 is constituted, for example, by a touch panel, detects a touch operation on a screen displayed on a display unit (not illustrated), and outputs a result of detection of the touch operation to the connection processing unit 107. The touch panel includes a call button and an emergency button. The touch operation includes a connecting operation.

When the result of detection of a connecting operation which is output from the operation detecting unit 108 is acquired, the connection processing unit 107 prepares a connection request with the set phone contact (the call center 200-2 or the call center 200-3) as a destination. The connection processing unit 107 outputs the prepared connection request to the communication unit 101. The communication unit 101 acquires the connection request output from the connection processing unit 107 and transmits the acquired connection request to the call center 200-1.

When the result of detection of a connecting operation is acquired from the operation detecting unit 108 and the nearby vehicle detecting unit 106 does not detect a dangerous vehicle, the connection processing unit 107 may prepare a connection request with a call center 200-4 as a destination. The connection processing unit 107 outputs the prepared connection request to the communication unit 101.

The impact detecting unit 104, the switching unit 105, the nearby vehicle detecting unit 106, the connection processing unit 107, and the operation detecting unit 108 are realized, for example, by causing a hardware processor such as a central processing unit (CPU) to execute a computer program (software) stored in the storage unit 110. Some or all of these functional units may be realized by hardware (a circuit unit including circuitry) such as a large-scale integration (LSI), an application-specific integrated circuit (ASIC), a field-programmable gate array (FPGA), or a graphics processing unit (GPU) or may be cooperatively realized by software and hardware.

(Operation of Information Processing System 1)

Figure 3:
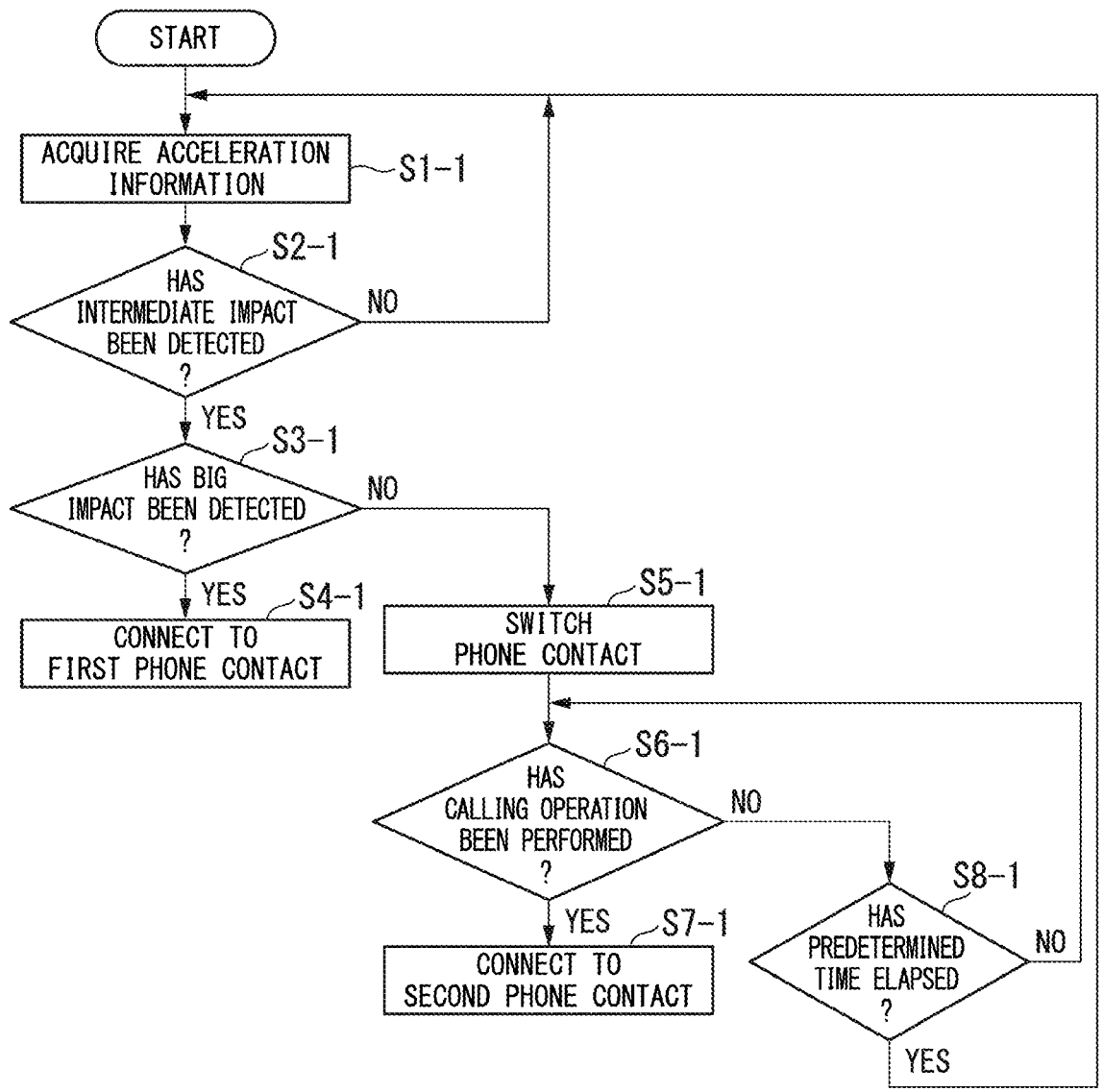
FIG. 3 is a flowchart illustrating Example 1 of an operation of the information processing system according to the first embodiment.

FIG. 3 is a flowchart illustrating Example 1 of the operation of the information processing system according to this embodiment.

An example of the operation of the in-vehicle imaging device 100 is mainly illustrated in FIG. 3. FIG. 3 illustrates the operation when an impact is applied to a vehicle 50.

Step S1-1

In the in-vehicle imaging device 100, the impact sensor 103 acquires information indicating acceleration of the vehicle 50.

Step S2-1

In the in-vehicle imaging device 100, the impact sensor prepares impact information including the information indicating acceleration and outputs the prepared impact information to the impact detecting unit 104. The impact detecting unit 104 acquires the impact information output from the impact sensor. The impact detecting unit 104 determines whether an intermediate impact has been detected by determining whether acceleration equal to or higher than a first acceleration threshold value has been detected within a predetermined time on the basis of the information indicating acceleration which is included in the acquired impact information. When the impact detecting unit 104 has not detected acceleration equal to or higher than the first acceleration threshold value, the routine returns to Step S1-1.

Step S3-1

In the in-vehicle imaging device 100, when acceleration equal to or higher than the first acceleration threshold value has been detected and thus an intermediate impact has been detected, the impact detecting unit 104 determines whether an intermediate impact has been detected or a big impact has been detected.

Step S4-1

In the in-vehicle imaging device 100, when it is determined that a big impact has been detected, the impact detecting unit 104 prepares impact detection information including information indicating that a big impact has been detected. The impact detecting unit 104 outputs the prepared impact detection information to the switching unit 105. The switching unit 105 acquires the impact detection information output from the impact detecting unit 104. When information indicating that a big impact has been detected is included in the acquired impact detection information, the switching unit 105 outputs a call request to the connection processing unit 107. The connection processing unit 107 acquires the call request output from the switching unit 105. The connection processing unit 107 prepares a call request with the set first phone contact (the call center 200-1) as a destination on the basis of the acquired call request. The connection processing unit 107 outputs the prepared call request to the communication unit 101. The communication unit 101 acquires the call request output from the connection processing unit 107 and transmits the acquired call request to the call center 200-1. Accordingly, the in-vehicle imaging device 100 connects to the first phone contact (the call center 200-1).

Step S5-1

In the in-vehicle imaging device 100, when it is determined that an intermediate impact has been detected, the impact detecting unit 104 prepares impact detection information including information indicating that an intermediate impact has been detected. The impact detecting unit 104 outputs the prepared impact detection information to the switching unit 105. The switching unit 105 acquires the impact detection information output from the impact detecting unit 104. When information indicating that an intermediate impact has been detected is included in the acquired impact detection information, the switching unit 105 prepares a switching request for requesting the connection processing unit 107 to switch the phone contact to the call center 200-2 and outputs the prepared switching request to the connection processing unit 107. The connection processing unit 107 acquires the switching request output from the switching unit 105 and switches the phone contact to the call center 200-2 on the basis of the acquired switching request.

Step S6-1

In the in-vehicle imaging device 100, the connection processing unit 107 determines whether a result of detection of a calling operation output from the operation detecting unit 108 has been acquired.

Step S7-1

In the in-vehicle imaging device 100, when the result of detection of a calling operation output from the operation detecting unit 108 has been acquired, the connection processing unit 107 prepares a connection request with the set second phone contact (the call center 200-2) as a destination. The connection processing unit 107 outputs the prepared connection request to the communication unit 101. The communication unit 101 acquires the connection request output from the connection processing unit 107 and transmits the acquired connection request to the call center 200-2. Accordingly, the in-vehicle imaging device 100 connects to the second phone contact (the call center 200-2).

Step S8-1

In the in-vehicle imaging device 100, when the result of detection of a calling operation has not been acquired from the operation detecting unit 108, the connection processing unit 107 determines whether a predetermined time has elapsed. The routine proceeds to Step S1-1 when the connection processing unit 107 determines that the predetermined time has elapsed, and the routine proceeds to Step S6-1 when it is determined that the predetermined time has not elapsed. The predetermined time is preferably a time less than 10 minutes, more preferably a time less than 5 minutes, and most preferably a time less than 3 minutes.

A case in which a user performs a calling operation after an impact has been detected is assumed, but since an impact may be detected after a user has performed a calling operation, the following routine may be performed. When a user performs a calling operation, the operation detecting unit 108 detects the calling operation and stores a time at which the calling operation has been detected in the storage unit 110. Thereafter, the impact detecting unit 104 detects an impact and stores a time at which the impact has been detected in the storage unit 110. When a result of detection of the calling operation output from the operation detecting unit 108 is acquired, the connection processing unit 107 compares the time at which the calling operation has been detected and the time at which the impact has been detected which are stored in the storage unit 110. When a difference between the time at which the calling operation has been detected and the time at which the impact has been detected is less than a predetermined time, the in-vehicle imaging device 100 connects to the first phone contact (the call center 200-1) when the impact is a big impact and connects to the second phone contact (the call center 200-2) when the impact is an intermediate impact. The predetermined time is preferably a time less than 1 minute and more preferably a time less than 10 seconds.

Figure 4:
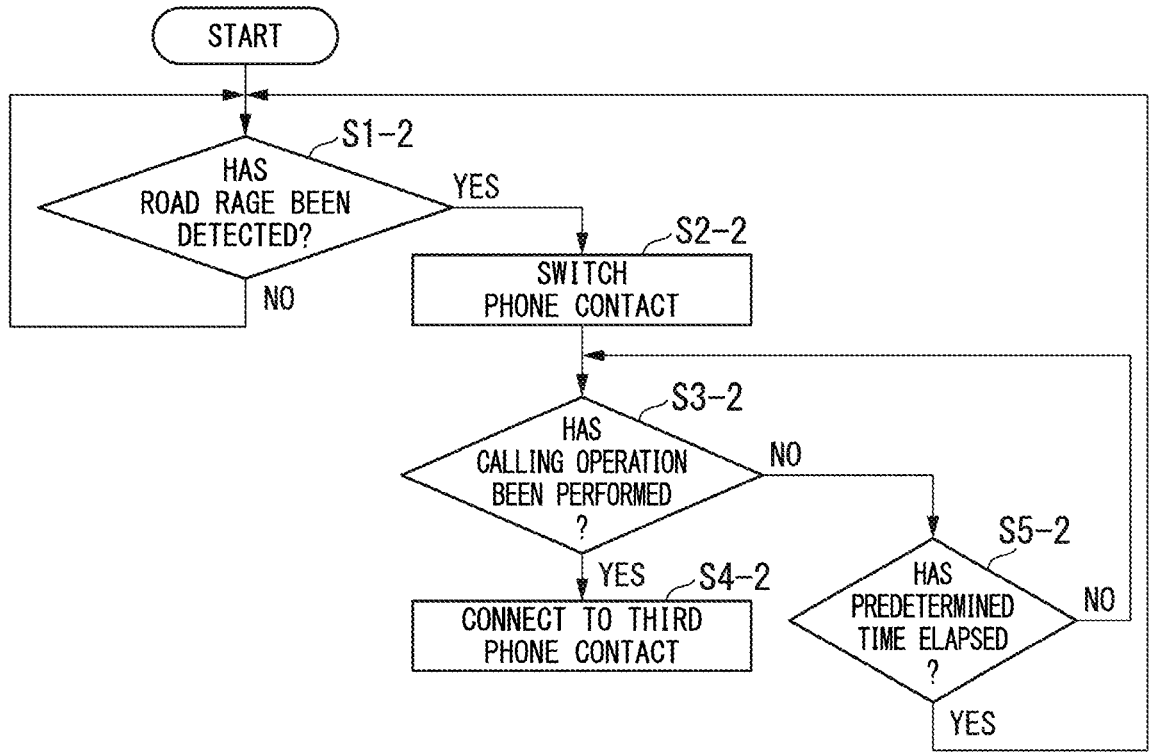
FIG. 4 is a flowchart illustrating Example 2 of the operation of the information processing system according to the first embodiment.

FIG. 4 is a flowchart illustrating Example 2 of the operation of the information processing system according to this embodiment. An example of the operation of the in-vehicle imaging device 100 is mainly illustrated in FIG. 4. FIG. 4 illustrates the operation when the in-vehicle imaging device 100 detects a vehicle near a vehicle 50.

Step S1-2 in the in-vehicle imaging device 100, the imaging unit 102 outputs image data to the nearby vehicle detecting unit 106. The nearby vehicle detecting unit 106 acquires the image data output from the imaging unit 102 and detects a vehicle near the vehicle 50 by processing the acquired image data. The nearby vehicle detecting unit 106 determines whether the nearby vehicle corresponds to a road-rage vehicle. When the nearby vehicle does not correspond to a road-rage vehicle, the routine returns to Step S1-2.

Step S2-2

In the in-vehicle imaging device 100, when it is determined that the nearby vehicle corresponds to a road-rage vehicle, the nearby vehicle detecting unit 106 prepares dangerous vehicle detection information including information indicating that a vehicle corresponding to a road-rage vehicle has been detected. The nearby vehicle detecting unit 106 outputs the prepared dangerous vehicle detection information to the switching unit 105. The switching unit 105 acquires the dangerous vehicle detection information output from the nearby vehicle detecting unit 106. The switching unit 105 switches the phone contact to the call center 200-3 which is a third phone contact for the connection processing unit 107 on the basis of the acquired dangerous vehicle detection information.

Step S3-2

In the in-vehicle imaging device 100, the connection processing unit 107 determines whether a result of detection of a connecting operation has been acquired from the operation detecting unit 108.

Step S4-2

In the in-vehicle imaging device 100, when a result of detection of a connecting operation has been acquired from the operation detecting unit 108, the connection processing unit 107 prepares a connection request with the set third phone contact (the call center 200-3) as destination. The connection processing unit 107 outputs the prepared connection request to the communication unit 101. The communication unit 101 acquires the connection request output from the connection processing unit 107 and transmits the acquired connection request to the call center 200-3. Accordingly, the in-vehicle imaging device 100 connects to the third phone contact (the call center 200-3).

Step S5-2

In the in-vehicle imaging device 100, when the result of detection of a connecting operation has not been acquired from the operation detecting unit 108, the connection processing unit 107 determines whether a predetermined time has elapsed. The routine proceeds to Step S1-2 when the connection processing unit 107 determines that the predetermined time has elapsed, and the routine proceeds to Step S3-2 when it is determined that the predetermined time has not elapsed. The predetermined time is preferably a time less than 10 minutes, more preferably a time less than 5 minutes, and most preferably a time less than 3 minutes.

A case in which a user performs a calling operation after road rage has been detected is assumed, but since road rage may be detected after a user has performed a calling operation. Specifically, a case in which another vehicle is being road-raged and then the host vehicle is likely to be road-raged is conceivable. For example, a road-rage vehicle traveling at an inter-vehicle distance less than a predetermined distance may be present in vehicles near the vehicle 50 included in the image data output from the imaging unit 102. In this case, the following routine may be performed. When a user performs a calling operation, the operation detecting unit 108 detects the calling operation and stores a time at which the calling operation has been detected in the storage unit 110. Thereafter, the nearby vehicle detecting unit 106 detects road rage and stores a time at which the road rage has been detected in the storage unit 110. When a result of detection of the calling operation output from the operation detecting unit 108 is acquired, the connection processing unit 107 compares the time at which the calling operation has been detected and the time at which the road rage has been detected which are stored in the storage unit 110. When a difference between the time at which the calling operation has been detected and the time at which the road rage has been detected is less than a predetermined time, the in-vehicle imaging device 100 connects to the set third phone contact (the call center 200-3). When the nearby vehicle detecting unit 106 does not detect road rage within a predetermined time after the result of detection of a calling operation output from the operation detecting unit 108 has been acquired, the connection processing unit 107 may connect to a call center 200-4 which is a fourth phone contact. The predetermined time is preferably a time less than 10 minutes, more preferably a time less than 5 minutes, and most preferably a time less than 3 minutes.

In the aforementioned embodiment, a case in which the connection processing unit 107 of the in-vehicle imaging device 100 connects to the second phone contact (the call center 200-2) or the third phone contact (the call center 200-3) when the operation detecting unit 108 has detected an operation of connecting to the phone contact is assumed, but the present invention is not limited to this example. For example, the connection processing unit 107 may connect to the first phone contact (the call center 200-1) when a request from the first phone contact (the call center 200-1) has been acquired, connect to the second phone contact (the call center 200-2) when a request from the second phone contact (the call center 200-2) has been acquired, or connect to the third phone contact (the call center 200-3) when a request from the third phone contact (the call center 200-3) has been acquired. Specifically, when the emergency button of the in-vehicle imaging device 100 is pressed, a notification is transmitted to a call center. The call center calls the in-vehicle imaging device 100 having transmitted the notification and connects to the in-vehicle imaging device 100. At this time, the call center may respond to the in-vehicle imaging device 100 having transmitted the notification by pushing an emergency button or a call button of a touch panel like answering a phone call or may connect thereto without such an operation.

In the aforementioned embodiment, the information processing system 1 includes three call centers, but the present invention is not limited thereto. For example, the information processing system 1 may include four or more call centers. Specifically, the in-vehicle imaging device 100 may determine whether the vehicle 50 has been traveling near a destination set by a car navigation system (not illustrated) for a predetermined time or more or whether the vehicle 50 stops near the destination for a predetermined time or more. When it is detected that the vehicle 50 has been traveling near the destination for the predetermined time or more or that the vehicle 50 stops near the destination for the predetermined time or more, the in-vehicle imaging device 100 may switch the phone contact to the fourth phone contact. The in-vehicle imaging device 100 may connect to the fourth phone contact when a connecting operation is detected.

Figure 5:
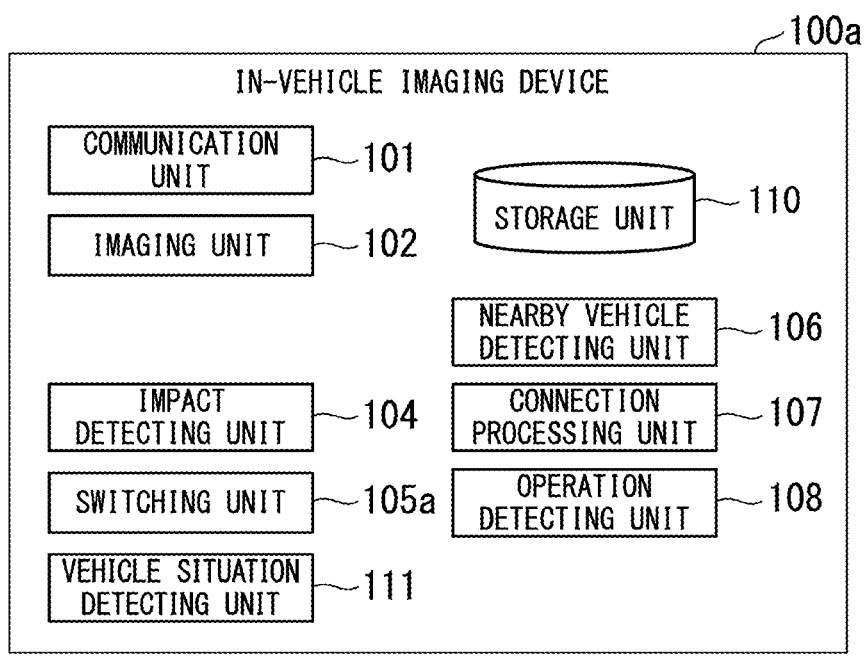
FIG. 5 is a diagram illustrating Example 1 of another configuration of the in-vehicle imaging device according to the first embodiment.

FIG. 5 is a diagram illustrating Example 1 of another configuration of the in-vehicle imaging device according to this embodiment.

The in-vehicle imaging device 100*a* includes a communication unit 101, an imaging unit 102, an impact detecting unit 104, a switching unit 105*a*, a nearby vehicle detecting unit 106, a connection processing unit 107, an operation detecting unit 108, a storage unit 110, and a vehicle situation detecting unit 111.

The vehicle situation detecting unit 111 detects that the vehicle 50 has been traveling near a destination set by a car navigation system (not illustrated) for a predetermined time or more or the vehicle 50 has stopped near the destination for a predetermined time or more. When it is detected that the vehicle 50 has been traveling near the destination for the predetermined time or more or that the vehicle 50 has stopped near the destination for the predetermined time or more, the vehicle situation detecting unit 111 prepares vehicle situation information including information indicating that the vehicle 50 has been traveling near the destination for the predetermined time or more or information indicating that the vehicle 50 has stopped near the destination for the predetermined time or more. The vehicle situation detecting unit 111 outputs the prepared vehicle situation information to the switching unit 105*a*. The vehicle situation detecting unit 111 acquires information required for the processing from the car navigation system (not illustrated).

The switching unit 105*a* can employ the switching unit 105. The switching unit 105*a* acquires the vehicle situation information output from the vehicle situation detecting unit 111. The switching unit 105*a* prepares a switching request for requesting the connection processing unit 107 to switch the phone contact to the fourth phone contact on the basis of the acquired vehicle situation information and outputs the prepared switching request to the connection processing unit 107.

The connection processing unit 107 acquires the switching request output from the switching unit 105*a* and sets the phone contact to the fourth phone contact indicated by the switching request on the basis of the acquired switching request. The connection processing unit 107 connects to the set fourth phone contact when a connection request is acquired from the switching unit 105*a*.

The in-vehicle imaging device 100 may determine whether the vehicle 50 is positioned in a specific location and determine whether a specific object is present near the vehicle 50. When it is determined that the vehicle 50 is positioned in a specific location or it is determined that a specific object is present near the vehicle 50, the in-vehicle imaging device 100 may switch the phone contact to a fifth phone contact. The in-vehicle imaging device 100 may connect to the fifth phone contact when a connecting operation is detected.

Figure 6:
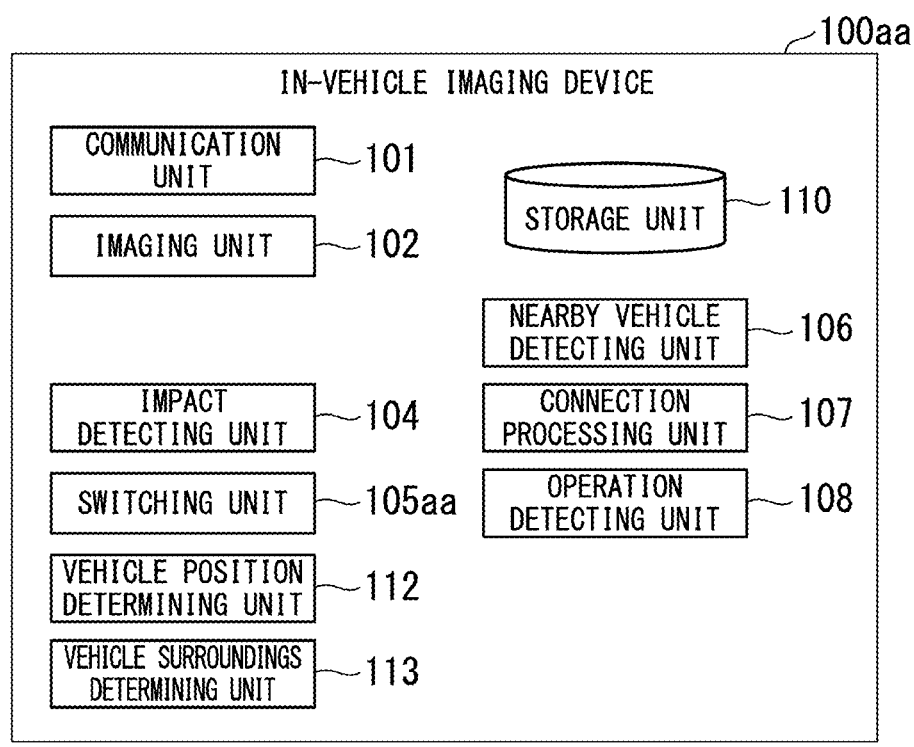
FIG. 6 is a diagram illustrating Example 2 of another configuration of the in-vehicle imaging device according to the first embodiment.

FIG. 6 is a diagram illustrating Example 2 of another configuration of the in-vehicle imaging device according to this embodiment.

The in-vehicle imaging device 100*aa* includes a communication unit 101, an imaging unit 102, an impact detecting unit 104, a switching unit 105*aa*, a nearby vehicle detecting unit 106, a connection processing unit 107, an operation detecting unit 108, a storage unit 110, a vehicle position determining unit 112, and a vehicle surroundings determining unit 113.

The vehicle position determining unit 112 determines whether the vehicle 50 is positioned in a specific location. For example, the vehicle position determining unit 112 acquires position information of the vehicle 50 from the car navigation system (not illustrated) and determines whether the position of the vehicle 50 corresponds to a preset specific location on the basis of the acquired position information of the vehicle 50. When it is determined that the position of the vehicle 50 corresponds to the specific location, the vehicle position determining unit 112 prepares information indicating that the position of the vehicle 50 corresponds to the specific location and outputs the prepared information to the switching unit 105*aa*.

The vehicle surroundings determining unit 113 acquires the position of the vehicle 50 from the vehicle position determining unit 112, acquires a position of a destination from the car navigation system (not illustrated), and determines whether a specific object is present in a specific range of the image data output from the imaging unit 102. When it is determined that a specific object is present, the vehicle surroundings determining unit 113 prepares information indicating that a specific object is present near the vehicle 50 and outputs the prepared information to the switching unit 105*aa*.

The switching unit 105*aa* can employ the switching unit 105. Here, when information indicating that the position of the vehicle 50 corresponds to a specific location has been acquired from the vehicle position determining unit 112 is acquired or information indicating that a specific object is present near the vehicle 50 has been acquired from the vehicle surroundings determining unit 113 is acquired, the switching unit 105*aa* prepares a switching request for requesting the connection processing unit 107 to switch the phone contact to the fifth phone contact and outputs the prepared switching request to the connection processing unit 107.

The connection processing unit 107 acquires the switching request output from the switching unit 105*aa* and sets the phone contact to the fifth phone contact indicated by the switching request on the basis of the acquired switching request. The connection processing unit 107 connects to the fifth phone contact when a connection request is acquired from the switching unit 105*aa*.

The vehicle situation detecting unit 111, the vehicle position determining unit 112, and the vehicle surroundings determining unit 113 are realized, for example, by causing a hardware processor such as a central processing unit (CPU) to execute a computer program (software) stored in the storage unit 110. Some or all of these functional units may be realized by hardware such as an LSI, an ASIC, an FPGA, or a GPU or may be cooperatively realized by software and hardware.

With the information processing system 1 according to this embodiment, the in-vehicle imaging device 100 includes the impact detecting unit 104 that detects an impact on the vehicle 50, the connection processing unit 107 that connects to the first phone contact when the impact detected by the impact detecting unit 104 is equal to or greater than a predetermined magnitude and connects to the second phone contact when the impact is less than the predetermined magnitude, and the operation detecting unit 108 that detects a user's operation. The connection processing unit 107 connects to the second phone contact when the operation detecting unit 108 either detects an operation for connecting to the phone contact or when acquires a request from the second phone contact.

With this configuration, the in-vehicle imaging device 100 can connect to an insurance company when an accident has occurred and also automatically connect to the first phone contact such as a call center for emergency when an accident is reliably considered to have occurred such as when the impact on the vehicle 50 is equal to or greater than the predetermined magnitude. The in-vehicle imaging device 100 can switch the phone contact to the second phone contact such as a call center for accident when the impact has a small magnitude such as when the impact is less than the predetermined magnitude and connect to the second phone contact when an operation for connecting to the phone contact such as pressing of a call button is detected or when a request from the second phone contact is acquired.

The in-vehicle imaging device 100 may further include the nearby vehicle detecting unit 106 that detects a road-rage vehicle traveling at an inter-vehicle distance less than a predetermined distance near the vehicle 50 for a predetermined time or more. When the nearby vehicle detecting unit 106 detects a road-rage vehicle and the operation detecting unit 108 either detects an operation for connecting to the phone contact or acquires a request from the third phone contact, the connection processing unit 107 may connect to the third phone contact.

With this configuration, the in-vehicle imaging device 100 can switch the phone contact to the third phone contact such as a call center for driving when a road-rage vehicle is detected and connect to the third phone contact when an operation for connecting to the phone contact such as pressing of a call button is detected or a request from the third phone contact is acquired. Here, the in-vehicle imaging device 100 may connect to the police when a road-rage vehicle is detected. When a vehicle of an assailant is a vehicle including a company name or the like, the in-vehicle imaging device 100 may connect to the corresponding company.

(Modified Example of First Embodiment)
(Information Processing System)

Figure 7:
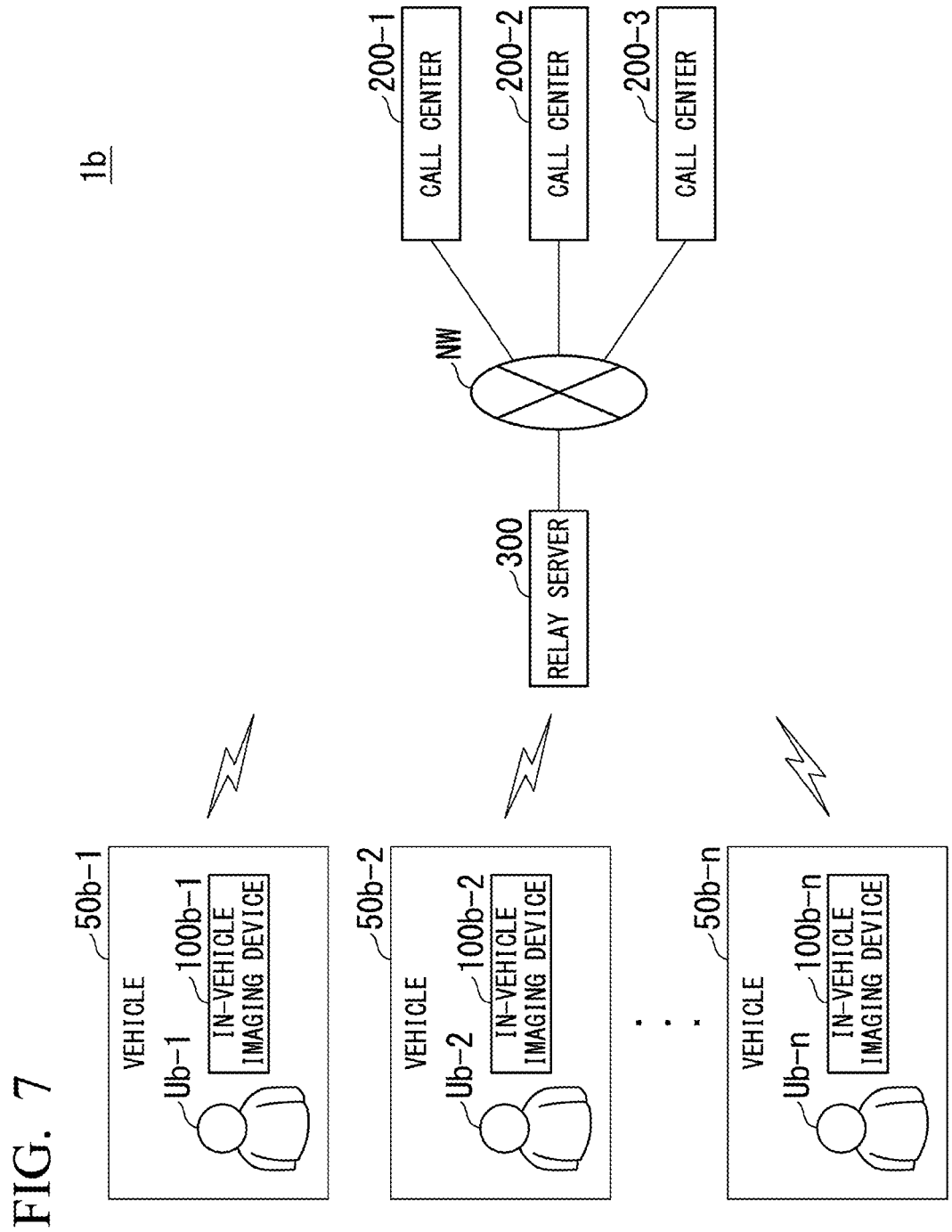
FIG. 7 is a diagram illustrating an example of a configuration of an information processing system according to a modified example of the first embodiment.

FIG. 7 is a diagram illustrating an example of a configuration of an information processing system according to a modified example of the first embodiment. In FIG. 7, an information processing system 1*b* includes an in-vehicle imaging device 100*b*-1, an in-vehicle imaging device 100*b*-2, . . . , an in-vehicle imaging device 100*b*-*n* (where n is an integer satisfying n>0), a call center 200-1, a call center 200-2, a call center 200-3, and a relay server 300.

The in-vehicle imaging device 100*b*-1, the in-vehicle imaging device 100*b*-2, . . . , and the in-vehicle imaging device 100*b*-*n* are connected to the relay server 300. The relay server 300, the call center 200-1, the call center 200-2, and the call center 200-3 communicate with each other via a network NW.

The in-vehicle imaging device 100*b*-1 is mounted in a vehicle 50*b*-1. The in-vehicle imaging device 100*b*-1 is wirelessly connected to the relay server 300 and is used by a user Ub-1. The in-vehicle imaging device 100*b*-2 is mounted in a vehicle 50*b*-2. The in-vehicle imaging device 100*b*-2 is wirelessly connected to the relay server 300 and is used by a user Ub-2. The in-vehicle imaging device 100*b*-*n* is mounted in a vehicle 50*b*-*n*. The in-vehicle imaging device 100*b*-*n* is wirelessly connected to the relay server 300 and is used by a user Ub-n.

In the following description, an arbitrary vehicle out of the vehicles 50*b*-1 to 50*b*-*n* is referred to as a vehicle 50*b*. An arbitrary in-vehicle imaging device out of the in-vehicle imaging devices 100*b*-1 to 100*b*-*n* is referred to as an in-vehicle imaging device 100*b*, and a user using the in-vehicle imaging device 100*b* is referred to as a user Ub.

The in-vehicle imaging device 100*b* acquires an image of the surroundings of the vehicle 50*b* in which the in-vehicle imaging device 100*b* is mounted. When an impact on the vehicle 50*b* is detected, the in-vehicle imaging device 100*b* prepares a call request with the relay server 300 as a destination including an in-vehicle imaging device ID and connection information of the in-vehicle imaging device 100*b* when the impact is equal to or greater than a predetermined magnitude. The in-vehicle imaging device 100*b* transmits the prepared call request. The relay server 300 receives the call request transmitted from the in-vehicle imaging device 100*b* and connects the in-vehicle imaging device 100*b* corresponding to the in-vehicle imaging device ID to the call center 200-1 which is a first phone contact on the basis of the in-vehicle imaging device ID and the connection request included in the received call request.

When an impact on the vehicle 50*b* is detected, the in-vehicle imaging device 100*b* prepares a connection request with the relay server 300 as a destination including an in-vehicle imaging device ID and connection information for connection to the call center 200-2 which is a second phone contact when the impact is less than the predetermined magnitude and a connecting operation of the user Ub is detected. The in-vehicle imaging device 100*b* transmits the prepared connection request.

The relay server 300 receives the connection request transmitted from the in-vehicle imaging device 100*b*. The relay server 300 connects the in-vehicle imaging device 100b corresponding to the in-vehicle imaging device ID to the call center 200-2 which is the second phone contact on the basis of the in-vehicle imaging device ID and the connection information included in the received connection request.

When a road-rage vehicle traveling at an inter-vehicle distance less than a predetermined distance near the vehicle 50b for the predetermined time or more and a connecting operation of the user Ub is detected, the in-vehicle imaging device 100b prepares a connection request with the relay server 300 as a destination including the in-vehicle imaging device ID and connection information for connection to the call center 200-3 which is the third phone contact. The in-vehicle imaging device 100b transmits the prepared connection request.

The relay server 300 receives the connection request transmitted from the in-vehicle imaging device 100b. The relay server 300 connects the in-vehicle imaging device 100b corresponding to the in-vehicle imaging device ID to the call center 200-3 which is the third phone contact on the basis of the in-vehicle imaging device ID and the connection information included in the received connection request.

The in-vehicle imaging device 100b and the relay server 300 included in the information processing system 1b will be described below.

Figure 8:
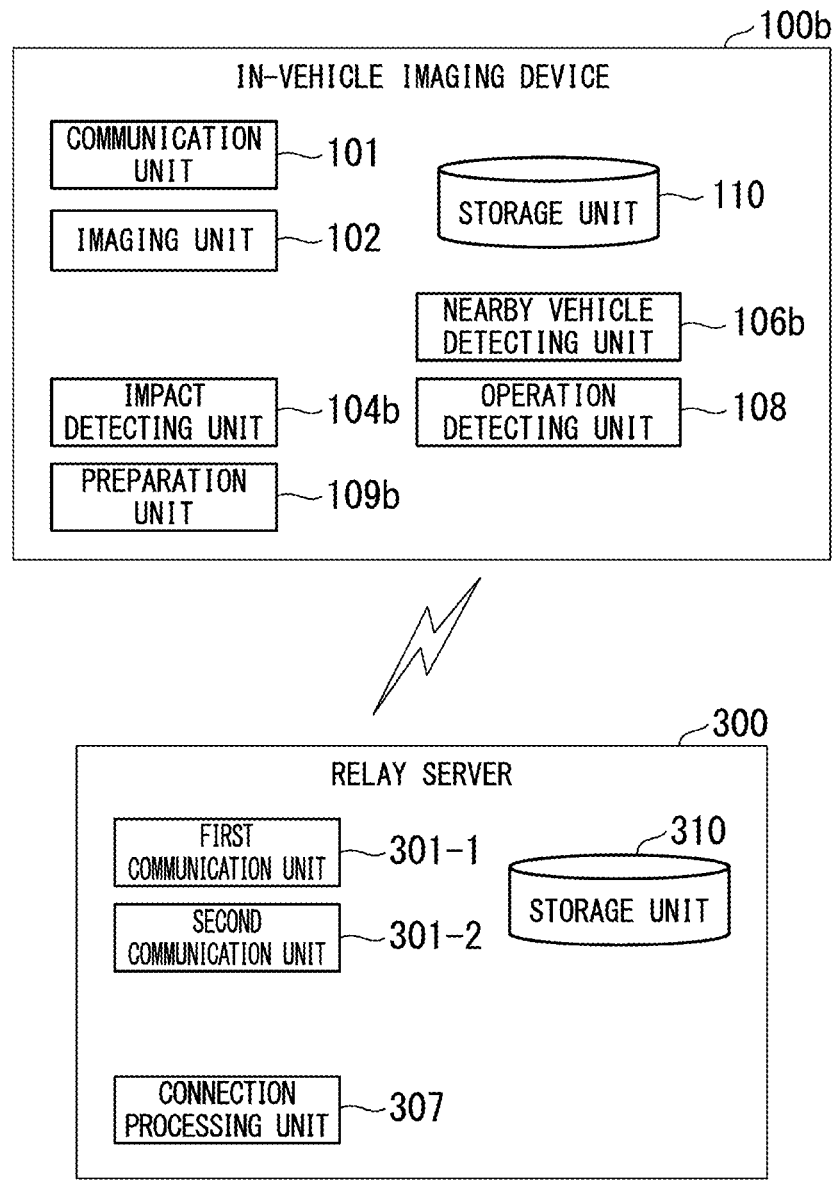
FIG. 8 is a diagram illustrating an example of a configuration of an in-vehicle imaging device and a server device according to a modified example of the first embodiment.

FIG. 8 is a diagram illustrating an example of a configuration of an in-vehicle imaging device and a server device according to a modified example of this embodiment.

(In-Vehicle Imaging Device 100b)

The in-vehicle imaging device 100b includes a communication unit 101, an imaging unit 102, an impact detecting unit 104b, a nearby vehicle detecting unit 106b, an operation detecting unit 108, a preparation unit 109b, and a storage unit 110.

An example of the in-vehicle imaging device 100b is a drive recorder. The in-vehicle imaging device 100b is an onboard image recording device. The in-vehicle imaging device 100b is installed in a vehicle 50b mainly for the purpose of recording a situation in which a vehicle accident occurs. The in-vehicle imaging device 100b records a situation inside or outside of the vehicle using the imaging unit 102 attached to a front windshield or a dashboard.

The communication unit 101 is realized by a communication module. The communication unit 101 communicates with an external communication device such as the relay server 300 via a network (not illustrated). The communication unit 101 may perform communication using a mobile communication system such as LTE (registered trademark) or a wireless communication system such as a wireless LAN. The communication unit 101 communicates with the relay server 300. The communication unit 101 transmits a call request and a connection request output from the preparation unit 109b to the relay server 300.

The imaging unit 102 outputs image data to the nearby vehicle detecting unit 106b. The storage unit 110 acquires the image data output from the nearby vehicle detecting unit 106b and records the acquired image data.

The operation detecting unit 108 outputs a result of detection of a touch operation to the preparation unit 109b. The touch operation includes a connecting operation.

The impact detecting unit 104b can employ the impact detecting unit 104. The impact detecting unit 104b outputs impact detection information to the preparation unit 109b.

The preparation unit 109b acquires impact detection information output from the impact detecting unit 104b. The preparation unit 109b acquires a result of detection of a connecting operation output from the operation detecting unit 108.

When information indicating that an intermediate impact has been detected is included in the acquired impact detection information and a result of detection of a connecting operation by the user Ub is acquired, the preparation unit 109b prepares a connection request with the relay server 300 as a destination including in-vehicle imaging device ID and connection information for connection to the call center 200-2 which is the second phone contact. The preparation unit 109b outputs the prepared connection request to the communication unit 101.

When information indicating that a big impact has been detected is included in the acquired impact detection information, the preparation unit 109b prepares a call request with the relay server 300 as a destination including in-vehicle imaging device ID. The preparation unit 109b outputs the prepared call request to the communication unit 101.

The nearby vehicle detecting unit 106b can employ the nearby vehicle detecting unit 106. Here, the nearby vehicle detecting unit 106b outputs the prepared dangerous vehicle detection information to the preparation unit 109b.

The preparation unit 109b acquires the dangerous vehicle detection information output from the nearby vehicle detecting unit 106b. When information indicating that a vehicle corresponding to a road-rage vehicle has been detected is included in the acquired dangerous vehicle detection information and a result of detection of a connecting operation by the user Ub is acquired, the preparation unit 109b prepares a connection request with the relay server 300 as a destination including in-vehicle imaging device ID and connection information for connection to the call center 200-3 which is the third phone contact. The preparation unit 109b outputs the prepared connection request to the communication unit 101.

(Relay Server 300)

The relay server 300 is realized by a device such as a personal computer, a server, a smartphone, a tablet computer, or an industrial computer. The relay server 300 includes, for example, a first communication unit 301-1, a second communication unit 301-2, a connection processing unit 307, and a storage unit 310.

The first communication unit 301-1 is realized by a communication module. The first communication unit 301-1 communicates with external communication devices such as the in-vehicle imaging devices 100b-1 to 100b-n via a network (not illustrated). The first communication unit 301-1 may perform communication using a mobile communication system such as LTE (registered trademark) or a wireless communication system such as a wireless LAN. The first communication unit 301-1 communicates with the in-vehicle imaging devices 100b-1 to 100b-n. The first communication unit 301-1 receives call requests and connection requests transmitted from the in-vehicle imaging devices 100b-1 to 100b-n.

The second communication unit 301-2 is realized by a communication module. The second communication unit 301-2 communicates with external communication devices such as the call centers 200-1 to 200-3 via the network NW. The second communication unit 301-2 may perform communication using a wired communication system such as a wired LAN. The second communication unit 301-2 may perform using a mobile communication system such as LTE (registered trademark) or a wireless communication system such as a wireless LAN. The second communication unit 301-2 communicates with the call centers 200-1 to 200-3.

The connection processing unit 307 acquires a call request received by the first communication unit 301-1. The connection processing unit 307 connects to, for example, the call center 200-1 on the basis of the acquired call request.

The connection processing unit 307 acquires a connection request received by the first communication unit 301-1. The connection processing unit 307 connects the in-vehicle imaging device 100*b* corresponding to the in-vehicle imaging device ID to the call center 200 indicated by the connection information on the basis of the in-vehicle imaging device ID and the connection information included in the acquired connection request.

(Operation of Information Processing System 1*b*)

Figure 9:
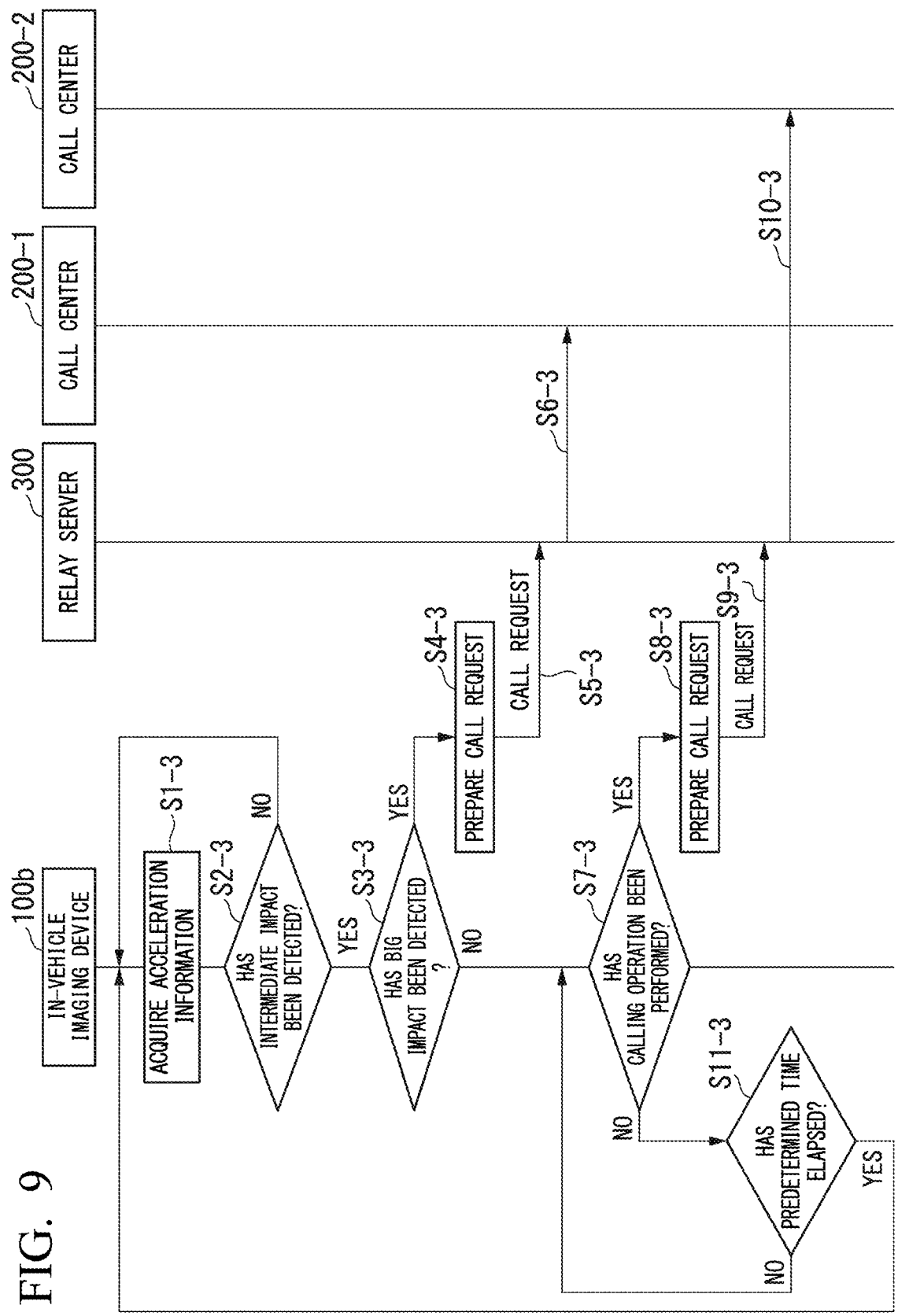
FIG. 9 is a flowchart illustrating Example 1 of an operation of an information processing system according to a modified example of the first embodiment.

FIG. 9 is a flowchart illustrating Example 1 of the operation of the information processing system according to the modified example of this embodiment. An example of the operation of the in-vehicle imaging device 100*b* and the relay server 300 is mainly illustrated in FIG. 9. FIG. 9 illustrates the operation when an impact is applied to a vehicle 50*b*.

Step S1-3

In the in-vehicle imaging device 100*b*, the impact sensor 103 acquires information indicating acceleration of the vehicle 50*b*.

Step S2-3

In the in-vehicle imaging device 100*b*, the impact sensor prepares impact information including the information indicating acceleration and outputs the prepared impact information to the impact detecting unit 104*b*. The impact detecting unit 104*b* acquires the impact information output from the impact sensor. The impact detecting unit 104*b* determines whether an intermediate impact has been detected by determining whether acceleration equal to or higher than a first acceleration threshold value has been detected on the basis of the information indicating acceleration which is included in the acquired impact information. When the impact detecting unit 104*b* has not detected acceleration equal to or higher than the first acceleration threshold value, the routine returns to Step S1-3.

Step S3-3

In the in-vehicle imaging device 100*b*, when acceleration equal to or higher than the first acceleration threshold value has been detected and thus an intermediate impact has been detected, the impact detecting unit 104*b* determines whether an intermediate impact has been detected or whether a big impact has been detected.

Step S4-3

In the in-vehicle imaging device 100*b*, when it is determined that a big impact has been detected, the impact detecting unit 104*b* prepares impact detection information including information indicating that a big impact has been detected. The impact detecting unit 104*b* outputs the prepared impact detection information to the preparation unit 109*b*. The preparation unit 109*b* acquires the impact detection information output from the impact detecting unit 104*b*. When information indicating that a big impact has been detected is included in the acquired impact detection information, the preparation unit 109*b* prepares a call request with the relay server 300 as a destination including in-vehicle imaging device ID.

Step S5-3

In the in-vehicle imaging device 100*b*, the preparation unit 109*b* outputs the prepared call request to the communication unit 101. The communication unit 101 acquires the call request output from the preparation unit 109*b* and transmits the acquired call request to the relay server 300.

Step S6-3

In the relay server 300, the first communication unit 301-1 receives the call request transmitted from the in-vehicle imaging device 100*b*. The connection processing unit 307 acquires the call request received by the first communication unit 301-1. The connection processing unit 307 makes a call to the call center 200-1 on the basis of the acquired call request.

Step S7-3

In the in-vehicle imaging device 100*b*, when it is determined that an intermediate impact has been detected, the impact detecting unit 104*b* prepares impact detection information including information indicating that an intermediate impact has been detected. The impact detecting unit 104*b* outputs the prepared impact detection information to the preparation unit 109*b*. The preparation unit 109*b* acquires the impact detection information output from the impact detecting unit 104*b*.

The operation detecting unit 108 determines whether a touch operation for connection has been detected.

Step S8-3

In the in-vehicle imaging device 100*b*, when the touch operation for connection has been detected, the operation detecting unit 108 outputs a result of detection of a connecting operation to the preparation unit 109*b*. The preparation unit 109*b* acquires the result of detection of a connecting operation output from the operation detecting unit 108. The preparation unit 109*b* prepares a connection request with the relay server 300 as a destination including in-vehicle imaging device ID and connection information on the basis of the acquired result of detection of a connecting operation.

Step S9-3

In the in-vehicle imaging device 100*b*, the preparation unit 109*b* outputs the prepared connection request to the communication unit 101. The communication unit 101 acquires the connection request output from the preparation unit 109*b* and transmits the acquired connection request to the relay server 300.

Step S10-3

In the relay server 300, the first communication unit 301-1 receives the connection request transmitted from the in-vehicle imaging device 100*b*. The connection processing unit 307 acquires the connection request received by the first communication unit 301-1 and connects to the call center 200-2 which is the set second phone contact on the basis of the acquired connection request.

Step S11-3

In the in-vehicle imaging device 100b, when the result of detection of a connecting operation has not been acquired from the operation detecting unit 108, the preparation unit 109b determines whether a predetermined time has elapsed. The routine proceeds to Step S1-3 when the preparation unit 109b determines that the predetermined time has elapsed, and the routine proceeds to Step S7-3 when it is determined that the predetermined time has not elapsed. The predetermined time is preferably a time less than 10 minutes, more preferably a time less than 5 minutes, and most preferably a time less than 3 minutes.

A case in which a user performs a calling operation after an impact has been detected is assumed above, but since an impact may be detected after a user has performed a calling operation, the following routine may be performed. When a user performs a calling operation, the operation detecting unit 108 detects the calling operation and stores a time at which the calling operation has been detected in the storage unit 110. Thereafter, the impact detecting unit 104b detects an impact and stores a time at which the impact has been detected in the storage unit 110. When a result of detection of the calling operation output from the operation detecting unit 108 is acquired, the preparation unit 109b compares the time at which the calling operation has been detected and the time at which the impact has been detected which are stored in the storage unit 110. When the difference between the time at which the calling operation has been detected and the time at which the impact has been detected is less than a predetermined time, the preparation unit 109b prepares a connection request with the relay server 300 as a destination including in-vehicle imaging device ID and connection information. The predetermined time is preferably a time less than 1 minute and more preferably a time less than 10 seconds.

Figure 10:
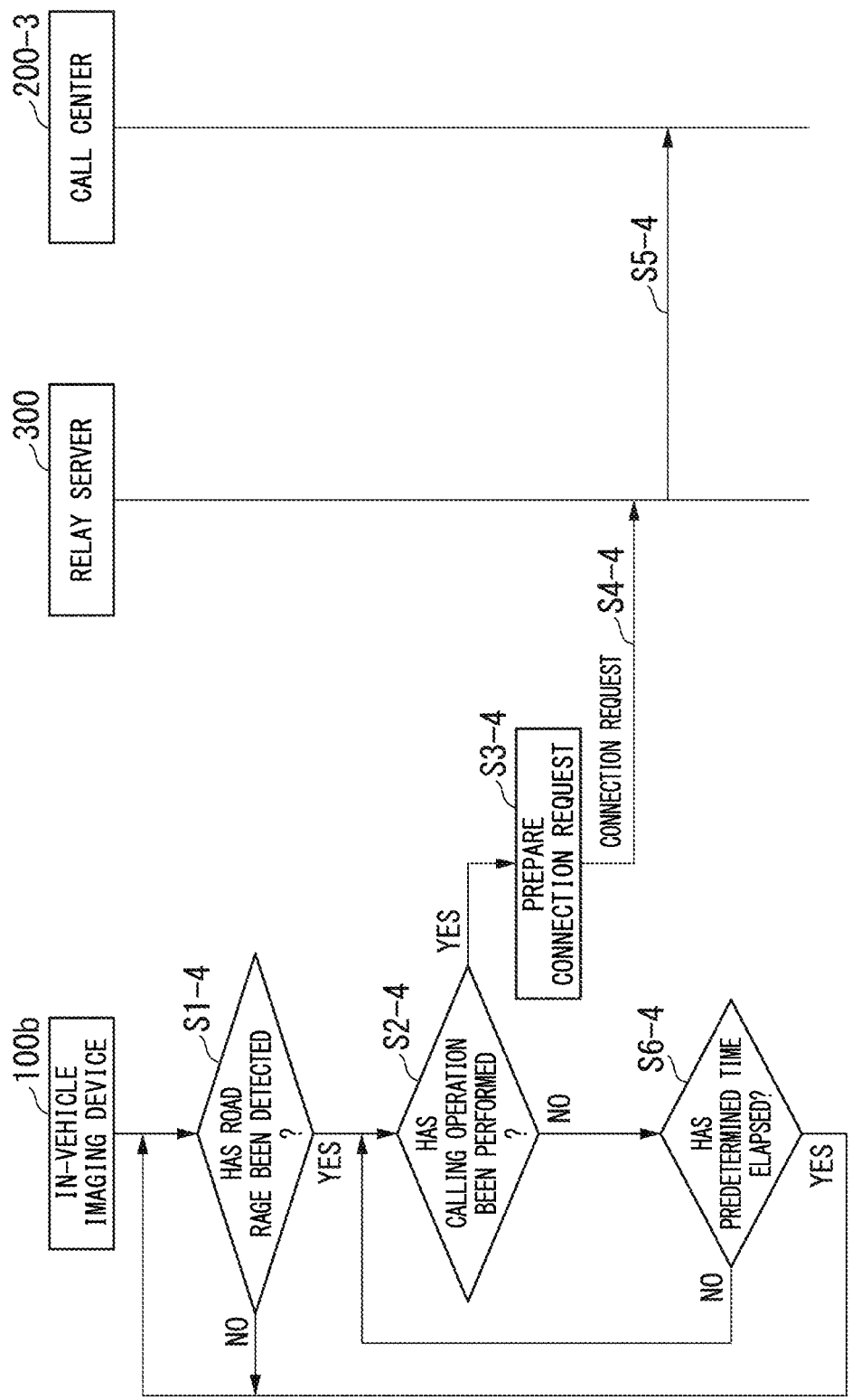
FIG. 10 is a flowchart illustrating Example 2 of the operation of the information processing system according to the modified example of the first embodiment.

FIG. 10 is a flowchart illustrating Example 2 of the operation of the information processing system according to the modified example of this embodiment. An example of the operations of the in-vehicle imaging device 100b and the relay server 300 is mainly illustrated in FIG. 10. FIG. 10 illustrates the operation when the in-vehicle imaging device 100b detects a vehicle near a vehicle 50b.

Step S1-4

In the in-vehicle imaging device 100b, the imaging unit 102 outputs image data to the nearby vehicle detecting unit 106b. The nearby vehicle detecting unit 106b acquires the image data output from the imaging unit 102 and detects a vehicle near the vehicle 50b by processing the acquired image data. The nearby vehicle detecting unit 106b determines whether the nearby vehicle corresponds to a road-rage vehicle.

Step S2-4

In the in-vehicle imaging device 100b, when it is determined that the nearby vehicle corresponds to a road-rage vehicle, the nearby vehicle detecting unit 106b prepares dangerous vehicle detection information including information indicating that a vehicle corresponding to a road-rage vehicle has been detected. The nearby vehicle detecting unit 106b outputs the prepared dangerous vehicle detection information to the preparation unit 109b. An example of the information indicating that a vehicle corresponding to a road-rage vehicle has been detected is a vehicle number or a company name of the vehicle.

The operation detecting unit 108 determines whether a touch operation for calling has been detected.

Step S3-4

In the in-vehicle imaging device 100b, when a touch operation for connection has been detected, the operation detecting unit 108 outputs the result of detection of a connecting operation to the preparation unit 109b. The preparation unit 109b acquires the result of detection of a connecting operation output from the operation detecting unit 108. The preparation unit 109b prepares a connection request with the relay server 300 as a destination including in-vehicle imaging device ID and connection information on the basis of the acquired result of detection of a connecting operation.

Step S4-4 in the in-vehicle imaging device 100b, the preparation unit 109b outputs the prepared connection request to the communication unit 101. The communication unit 101 acquires the connection request output from the preparation unit 109b and transmits the acquired connection request to the relay server 300.

Step S5-4

In the relay server 300, the first communication unit 301-1 receives the connection request transmitted from the in-vehicle imaging device 100b. The connection processing unit 307 acquires the connection request received by the first communication unit 301-1 and connects to the call center 200-3 which is the set third phone contact on the basis of the acquired connection request.

Step S6-4

In the in-vehicle imaging device 100b, the preparation unit 109b determines whether a predetermined time has elapsed. The routine proceeds to Step S1-4 when the preparation unit 109b determines that the predetermined time has elapsed, and the routine proceeds to Step S2-4 when it is determined that the predetermined time has not elapsed. The predetermined time is preferably a time less than 10 minutes, more preferably a time less than 5 minutes, and most preferably a time less than 3 minutes.

A case in which a user performs a calling operation after road rage has been detected is assumed above, but since road rage may be detected after a user has performed a calling operation. Specifically, a case in which another vehicle is being road-raged and then the host vehicle is likely to be road-raged is conceivable. For example, a road-rage vehicle traveling at an inter-vehicle distance less than a predetermined distance may be present in vehicles near the vehicle 50b included in the image data output from the imaging unit 102. In this case, the following routine may be performed. When a user performs a calling operation, the operation detecting unit 108 detects the calling operation and stores a time at which the calling operation has been detected in the storage unit 110. Thereafter, the nearby vehicle detecting unit 106b detects road rage and stores a time at which the road rage has been detected in the storage unit 110. When a result of detection of the calling operation output from the operation detecting unit 108 is acquired, the preparation unit 109b compares the time at which the calling operation has been detected and the time at which the road rage has been detected which are stored in the storage unit 110. When a difference between the time at which the calling operation has been detected and the time at which the road rage has been detected is less than a predetermined time, the preparation unit 109b prepares a connection request with the relay server 300 as a destination including in-vehicle imaging device ID and connection information. The predetermined time is preferably a time less than 10 minutes, more preferably a time less than 5 minutes, and most preferably a time less than 3 minutes.

In the aforementioned modified example of this embodiment, the information processing system 1b includes three call centers, but the present invention is not limited thereto. For example, the information processing system 1b may include four or more call centers. Specifically, the in-vehicle imaging device 100b may determine whether the vehicle 50b has been traveling near a destination set by a car navigation system (not illustrated) for a predetermined time or more or whether the vehicle 50b has stopped near the destination for a predetermined time or more. When it is detected that the vehicle 50b has been traveling near the destination for the predetermined time or more or that the vehicle 50b has stopped near the destination for the predetermined time or more and an operation is detected, the in-vehicle imaging device 100b may connect to the fourth phone contact.

Figure 11:
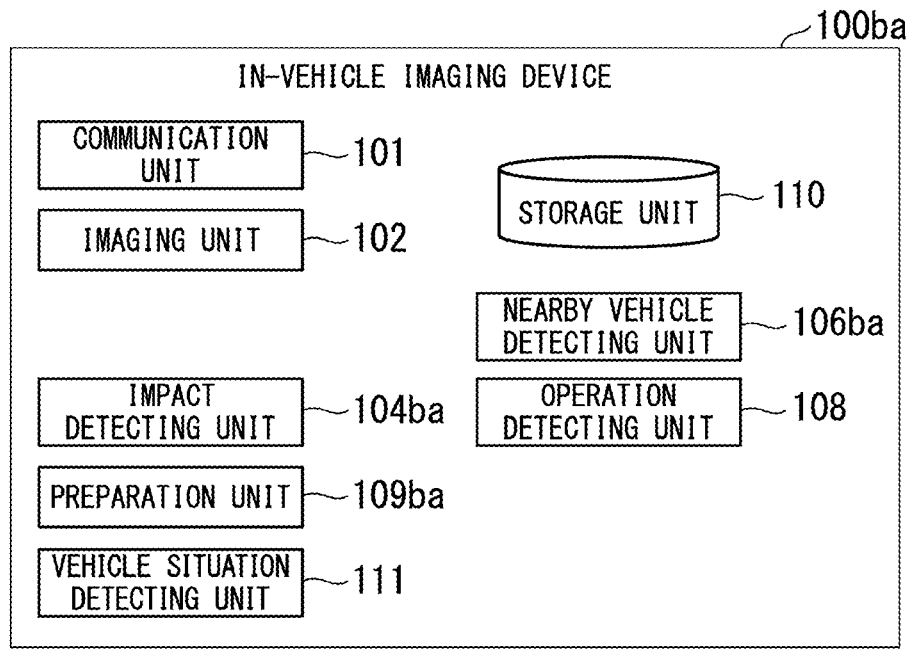
FIG. 11 is a diagram illustrating Example 1 of another configuration of the in-vehicle imaging device according to the modified example of the first embodiment.

FIG. 11 is a diagram illustrating Example t of another configuration of an in-vehicle imaging device according to the modified example of this embodiment.

The in-vehicle imaging device 100ba includes a communication unit 101, an imaging unit 102, an impact detecting unit 104ba, a nearby vehicle detecting unit 106ba, an operation detecting unit 108, a preparation unit 109ba, a storage unit 110, and a vehicle situation detecting unit 111.

The vehicle situation detecting unit 111 detects that the vehicle 50b has been traveling near a destination set by a car navigation system (not illustrated) for a predetermined time or more or that the vehicle 50b has stopped near the destination for a predetermined time or more. When it is detected that the vehicle 50b has been traveling near the destination for the predetermined time or more or that the vehicle 50b has stopped near the destination for the predetermined time or more, the vehicle situation detecting unit Ill prepares vehicle situation information including information indicating that the vehicle 50b has been traveling near the destination for the predetermined time or more or information indicating that the vehicle 50b has stopped near the destination for the predetermined time or more. The vehicle situation detecting unit 111 outputs the prepared vehicle situation information to the preparation unit 109ba. The vehicle situation detecting unit 111 acquires information required for the processing from the car navigation system (not illustrated).

The preparation unit 109ba acquires the vehicle situation information output from the vehicle situation detecting unit 111. When information indicating that the vehicle 50b has been traveling near the destination for the predetermined time or more or information indicating that the vehicle 50b has stopped near the destination for the predetermined time or more is included in the acquired vehicle situation information and a result of detection of a connecting operation by the user Ub is acquired, the preparation unit 109ba prepares a connection request with the relay server 300 as a destination including in-vehicle imaging device ID and connection information for connection to the fourth phone contact. The preparation unit 109ba output the prepared connection request to the communication unit 101.

The in-vehicle imaging device 100b may determine whether the vehicle 50b is positioned in a specific location and determine whether a specific object is present near the vehicle 50b. When it is determined that the vehicle 50b is positioned in a specific location or it is determined that a specific object is present near the vehicle 50b, the in-vehicle imaging device 100ba may connect to a fifth phone contact. The in-vehicle imaging device 100ba may connect to the fifth phone contact when a connecting operation is detected.

Figure 12:
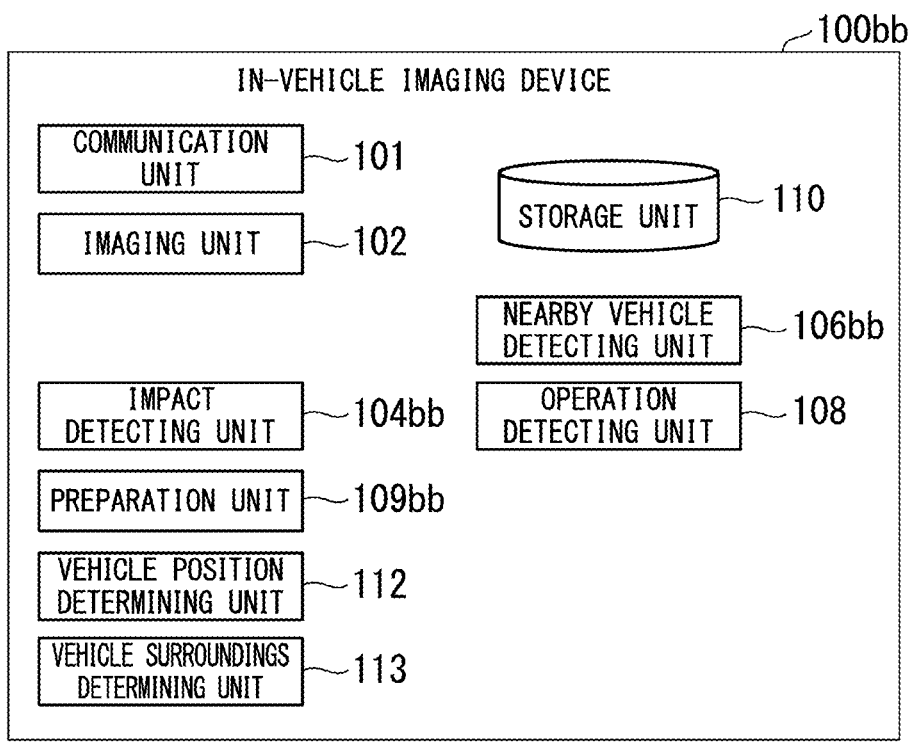
FIG. 12 is a diagram illustrating Example 2 of another configuration of the in-vehicle imaging device according to the modified example of the first embodiment.

FIG. 12 is a diagram illustrating Example 2 of another configuration of the in-vehicle imaging device according to the modified example of this embodiment.

The in-vehicle imaging device 100bb includes a communication unit 101, an imaging unit 102, an impact detecting unit 104bb, a nearby vehicle detecting unit 106bb, an operation detecting unit 108, a preparation unit 109bb, a storage unit 110, a vehicle position determining unit 112, and a vehicle surroundings determining unit 113.

The vehicle position determining unit 112 determines whether the vehicle 50b is positioned in a specific location. For example, the vehicle position determining unit 112 acquires position information of the vehicle 50b from the car navigation system (not illustrated) and determines whether the position of the vehicle 50b corresponds to a preset specific location on the basis of the acquired position information of the vehicle 50b. When it is determined that the position of the vehicle 50b corresponds to the specific location, the vehicle position determining unit 112 prepares information indicating that the position of the vehicle 50b corresponds to the specific location and outputs the prepared information to the preparation unit 109bb.

The vehicle surroundings determining unit 113 acquires the position of the vehicle 50b from the vehicle position determining unit 112, acquires a position of a destination from the car navigation system (not illustrated), and determines whether a specific object is present in a specific range of the image data output from the imaging unit 102. When it is determined that a specific object is present, the vehicle surroundings determining unit 113 prepares information indicating that a specific object is present near the vehicle 50b and outputs the prepared information to the preparation unit 109bb.

The preparation unit 109bb acquires information indicating the vehicle 50b is positioned in a specific location which is output from the vehicle position determining unit 112 or information indicating that a specific object is present near the vehicle 50b which is output from the vehicle surroundings determining unit 113 and prepares a connection request with the relay server 300 as a destination including in-vehicle imaging device ID and connection information for connection to the fifth phone contact when a result of detection of a connecting operation by the user Ub is acquired. The preparation unit 109bb outputs the prepared connection request to the communication unit 101.

With the information processing system 1b according to the modified example of this embodiment, the in-vehicle imaging device 100b further includes the vehicle situation detecting unit 111 detecting that the vehicle 50b has been traveling near the destination set by the car navigation system for the predetermined time or more or that the vehicle 50b has stopped near the destination for the predetermined time or more in the in-vehicle imaging device 100. When the vehicle situation detecting unit 111 detects either that the vehicle 50b has been traveling near the destination for the predetermined time or more or that the vehicle 50b has stopped near the destination for the predetermined time or more and the operation detecting unit 108 either detects an operation of connecting to a phone contact or acquires a request from the fourth phone contact, the connection processing unit 107 connects to the fourth phone contact.

With this configuration, for example, when another vehicle stops in a parking lot of the host vehicle and thus the vehicle 50b has been traveling near the destination set by the car navigation system for the predetermined time or more or the vehicle 50b has stopped near the destination for the predetermined time or more, the in-vehicle imaging device 100b can switch the phone contact to the fourth phone contact such as a call center for troubles and connect to the fourth phone contact when a connecting operation to the phone contact is detected.

The in-vehicle imaging device 100b further includes the vehicle position determining unit 112 determining whether the vehicle 50b is positioned in a specific location and the vehicle surroundings determining unit 113 determining whether a specific object is present near the vehicle 50b. When either the vehicle position determining unit 112 determines that the vehicle 50b is positioned in a specific location or the vehicle surroundings determining unit 113 determines that a specific object is present near the vehicle 50b and the operation detecting unit 108 either detects a connecting operation to the phone contact or acquires a request from the fifth phone contact, the connection processing unit 107 connects to the fifth phone contact.

With this configuration, when it is determined that there is a specific location such as a railroad crossing, tracks of a tramcar, a crossing, or a highway or a specific object such as a railroad crossing, tracks of a tramcar, a crossing, or a highway, it is conceivable that there be a high likelihood that an accident will occur. Accordingly, the in-vehicle imaging device 100b can connect to the fifth phone contact when a connecting operation to the phone contact is detected.

Second Embodiment (Information Processing System)

Figure 13:
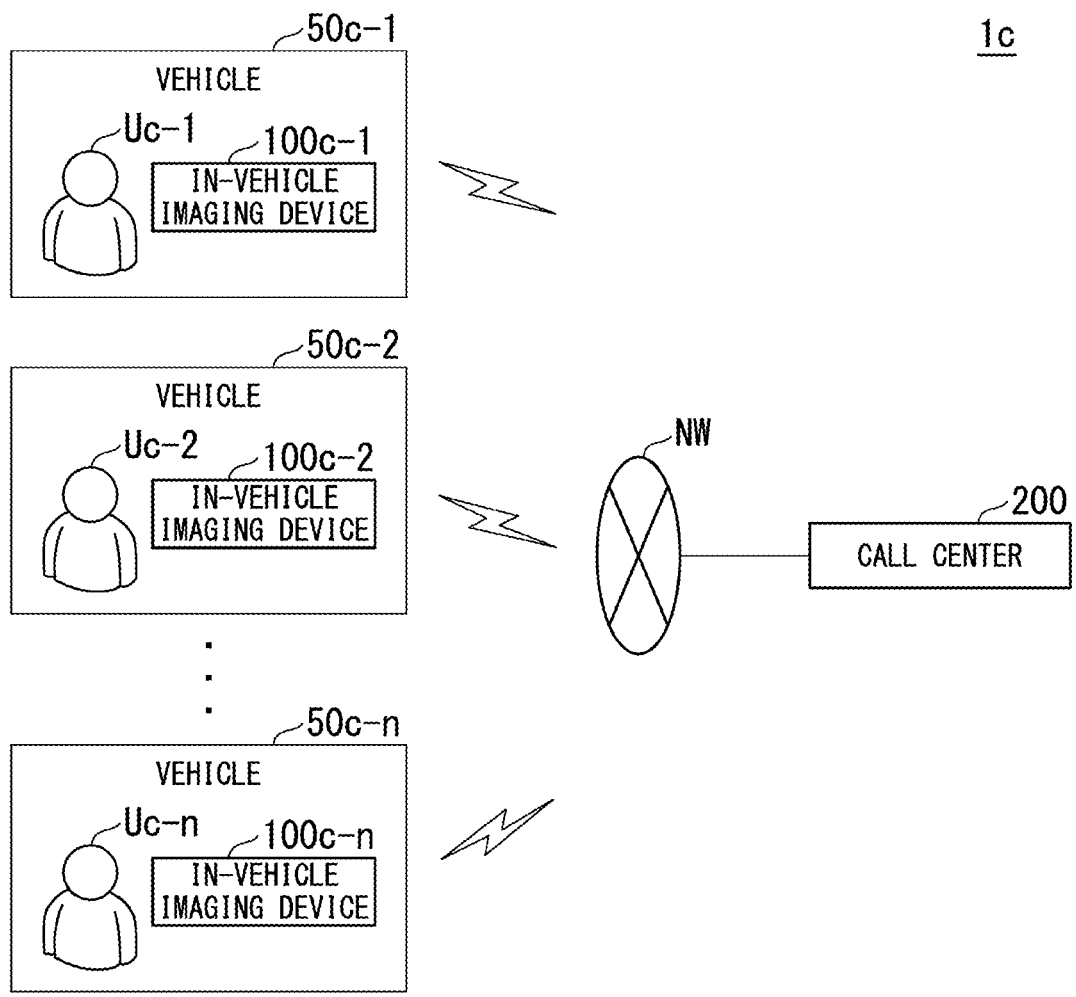
FIG. 13 is a diagram illustrating an example of a configuration of an information processing system according to a second embodiment of the present invention.

FIG. 13 is a diagram illustrating an example of a configuration of an information processing system according to a second embodiment of the present invention. In FIG. 13, an information processing system 1c includes an in-vehicle imaging device 100c-1, an in-vehicle imaging device 100c-2, ..., an in-vehicle imaging device 100c-n (where n is an integer satisfying n>0), and a call center 200.

The in-vehicle imaging device 100c-1, the in-vehicle imaging device 100c-2, ..., the in-vehicle imaging device 100c-n, and the call center 200 communicate with each other via a network NW.

The in-vehicle imaging device 100c-1 is mounted in a vehicle 50c-1. The in-vehicle imaging device 100c-1 is used by a user Uc-1. The in-vehicle imaging device 100c-2 is mounted in a vehicle 50c-2. The in-vehicle imaging device 100c-2 is used by a user Uc-2. The in-vehicle imaging device 100c-n is mounted in a vehicle 50c-n. The in-vehicle imaging device 100c-n is used by a user Uc-n.

In the following description, an arbitrary vehicle out of the vehicles 50c-1 to 50c-n is referred to as a vehicle 50c. An arbitrary in-vehicle imaging device out of the in-vehicle imaging devices 100c-1 to 100c-n is referred to as an in-vehicle imaging device 100c, and a user using the in-vehicle imaging device 100c is referred to as a user Uc.

The in-vehicle imaging device 100c images the surroundings of the vehicle 50c in which the in-vehicle imaging device 100c is mounted. When an impact on the vehicle 50c is detected and the impact is equal to or greater than a predetermined magnitude, the in-vehicle imaging device 100c connects to the call center 200 which is a phone contact with a first priority. When an impact on the vehicle 50c is detected, the impact is less than the predetermined magnitude, and a connecting operation to the phone contact by the user Uc is detected, the in-vehicle imaging device 100c connected to the call center 200 which is a phone contact with a second priority.

When the connecting operation to the phone contact by the user Uc is detected and a road-rage vehicle traveling at an inter-vehicle distance less than a predetermined distance near the vehicle 50c for a predetermined time or more is detected, the in-vehicle imaging device 100c connects to the call center 200 which is a phone contact with a third priority.

When the connecting operation to the phone contact by the user Uc is detected and a road-rage vehicle traveling near the vehicle 50c is not detected, the in-vehicle imaging device 100c may connect to the call center 200 which is a phone contact with a fourth priority.

The call center 200 copes with the user Uc on the basis of the priorities.

The in-vehicle imaging device 100c included in the information processing system 1e will be described below.

(In-Vehicle Imaging Device 100c)

Figure 14:
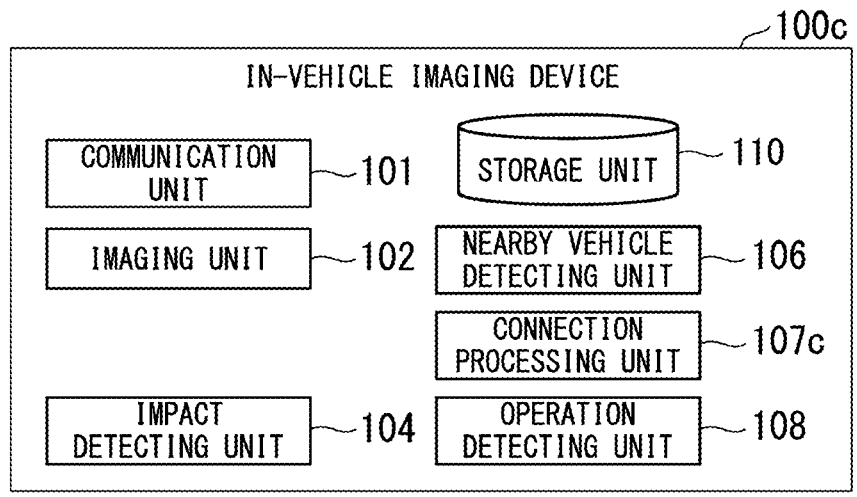
FIG. 14 is a diagram illustrating an example of a configuration of an in-vehicle imaging device according to the second embodiment.

FIG. 14 is a diagram illustrating an example of a configuration of an in-vehicle imaging device according to this embodiment.

The in-vehicle imaging device 100c includes a communication unit 101, an imaging unit 102, an impact detecting unit 104, a nearby vehicle detecting unit 106, a connection processing unit 107c, an operation detecting unit 108, and a storage unit 110.

An example of the in-vehicle imaging device 100c is a drive recorder. The in-vehicle imaging device 100c is an onboard image recording device. The in-vehicle imaging device 100c is installed in a vehicle 50c mainly for the purpose of recording a situation in which a vehicle accident occurs. The in-vehicle imaging device 100c records a situation inside or outside of the vehicle using the imaging unit 102 attached to a front windshield or a dashboard.

The communication unit 101 is realized by a communication module. The communication unit 101 communicates with an external communication device such as the call center 200 via a network NW.

The impact detecting unit 104 outputs impact detection information to the connection processing unit 107c.

The connection processing unit 107c can employ the connection processing unit 107. Here, the connection processing unit 107c acquires the impact detection information output from the impact detecting unit 104. When information indicating that a big impact has been detected is included in the acquired impact detection information, the connection processing unit 107c prepares a connection request with the first priority. The connection processing unit 107c outputs the prepared connection request to the communication unit 101.

When information indicating that an intermediate impact has been detected is included in the acquired impact detection information and then a result of detection of a connecting operation is acquired from the operation detecting unit 108, the connection processing unit 107c prepares a connection request with the second priority. The connection processing unit 107c outputs the prepared connection request to the communication unit 101.

The nearby vehicle detecting unit 106 acquires image data output from the imaging unit 102 and detects a vehicle near the vehicle 50c by processing the acquired image data. When a vehicle near the vehicle 50c is detected, the nearby vehicle detecting unit 106 determines whether the nearby vehicle is a road-rage vehicle which has been traveling at an inter-vehicle distance less than a predetermined distance near the vehicle 50c for a predetermined time or more. When a vehicle corresponding to a road-rage vehicle is detected, the nearby vehicle detecting unit 106 stores the image data in the storage unit 110 and prepares dangerous vehicle detection information including information indicating that a vehicle corresponding to a road-rage vehicle has been detected. An example of the information indicating that a vehicle corresponding to a road-rage vehicle has been detected is a vehicle number or a company name of the vehicle. The nearby vehicle detecting unit 106 outputs the prepared dangerous vehicle detection information to the connection processing unit 107c.

When a result of detection of a connecting operation is acquired from the operation detecting unit 108 and the dangerous vehicle detection information is acquired from the nearby vehicle detecting unit 106, the connection processing unit 107c prepares a connection request with the third priority. The connection processing unit 107c outputs the prepared connection request to the communication unit 101.

When a result of detection of a connecting operation is acquired from the operation detecting unit 108 and the dangerous vehicle detection information is not acquired from the nearby vehicle detecting unit 106 even with the elapse of a predetermined time, the connection processing unit 107c may prepare a connection request with the fourth priority. The connection processing unit 107c outputs the prepared connection request to the communication unit 101.

(Operation of Information Processing System 1c)

Figure 15:
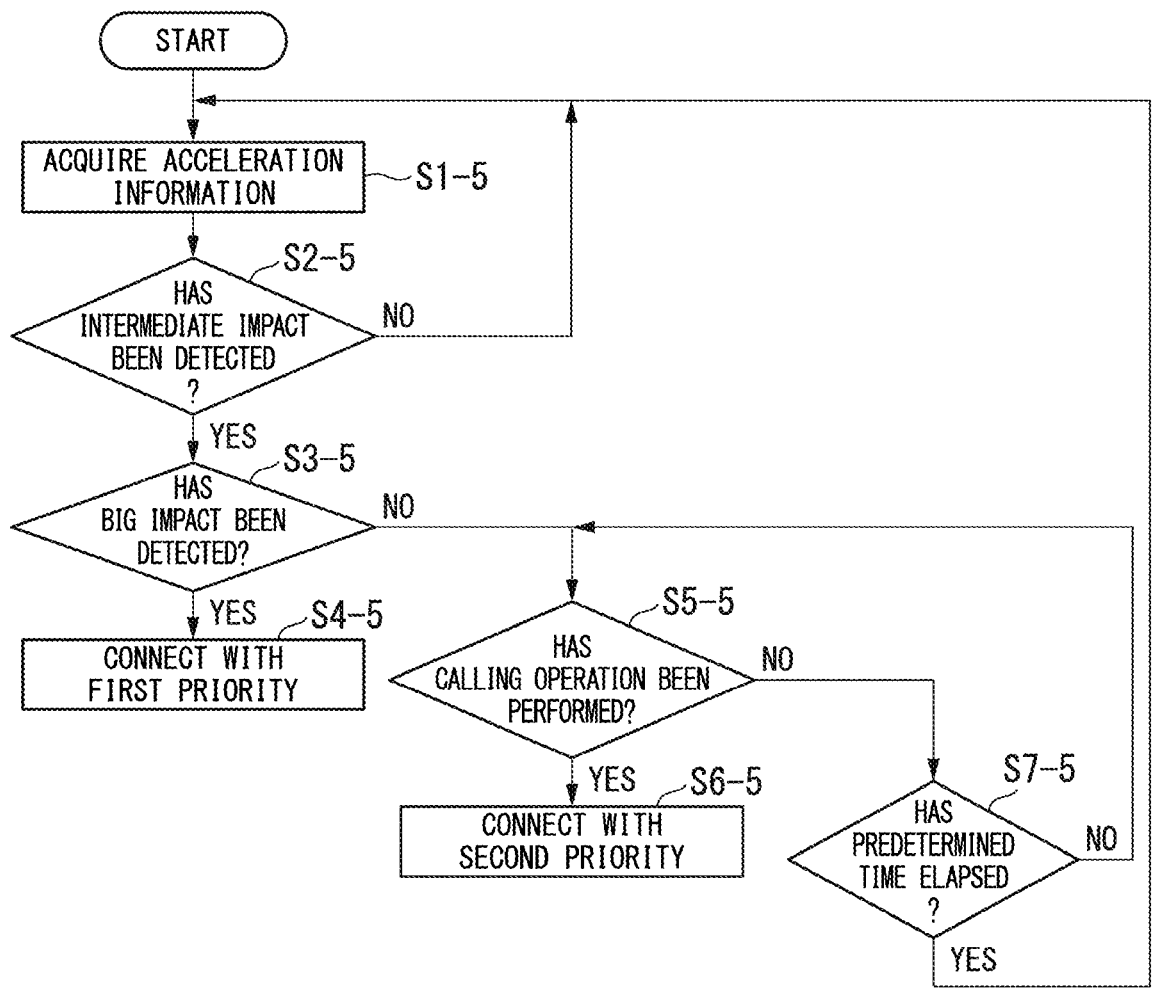
FIG. 15 is a flowchart illustrating Example 1 of an operation of the information processing system according to the second embodiment.

FIG. 15 is a flowchart illustrating Example 1 of the operation of the information processing system according to this embodiment.

An example of the operation of the in-vehicle imaging device 100c is mainly illustrated in FIG. 15. FIG. 15 illustrates the operation when an impact is applied to a vehicle 50c.

Step S1-5

In the in-vehicle imaging device 100c, the impact sensor 103 acquires information indicating acceleration of the vehicle 50c.

Step S2-5

In the in-vehicle imaging device 100c, the impact sensor prepares impact information including the information indicating acceleration and outputs the prepared impact information to the impact detecting unit 104. The impact detecting unit 104 acquires the impact information output from the impact sensor. The impact detecting unit 104 determines whether an intermediate impact has been detected by determining whether acceleration equal to or higher than a first acceleration threshold value has been detected within a predetermined time on the basis of the information indicating acceleration which is included in the acquired impact information. When the impact detecting unit 104 has not detected an intermediate impact, the routine returns to Step S5-1.

Step S3-5

In the in-vehicle imaging device 100c, when an intermediate impact has been detected, the impact detecting unit 104 determines whether a big impact has been detected.

Step S4-5

In the in-vehicle imaging device 100c, when it is determined that a big impact has been detected, the impact detecting unit 104 prepares impact detection information including information indicating that a big impact has been detected. The impact detecting unit 104 outputs the prepared impact detection information to the connection processing unit 107c.

The connection processing unit 107c acquires the impact detection information output from the impact detecting unit 104. When information indicating that a big impact has been detected is included in the acquired impact detection information, the connection processing unit 107c prepares a connection request with the first priority. The connection processing unit 107c outputs the prepared connection request to the communication unit 101. The communication unit 101 acquires the connection request output from the connection processing unit 107c and transmits the acquired connection request to the call center 200.

Step S5-5

In the in-vehicle imaging device 100c, when it is determined that an intermediate impact has been detected, the impact detecting unit 104 prepares impact detection information including information indicating that an intermediate impact has been detected. The impact detecting unit 104 outputs the prepared impact detection information to the connection processing unit 107c. The connection processing unit 107c acquires the impact detection information output from the impact detecting unit 104. When information indicating that an intermediate impact has been detected is included in the acquired impact detection information, the connection processing unit 107c determines whether a result of detection of a connecting operation is then acquired from the operation detecting unit 108.

Step S6-5

In the in-vehicle imaging device 100c, when a result of detection of a connecting operation is acquired from the operation detecting unit 108, the connection processing unit 107c prepares a connection request with the second priority. The connection processing unit 107c outputs the prepared connection request to the communication unit 101. The communication unit 101 acquires the connection request output from the connection processing unit 107c and transmits the acquired connection request to the call center 200.

Step S7-5

In the in-vehicle imaging device 100c, the connection processing unit 107c determines whether a predetermined has elapsed. The routine proceeds to Step S1-5 when the connection processing unit 107c determines that the predetermined time has elapsed, and the routine proceeds to Step S5-5 when it is determined that the predetermined time has not elapsed. The predetermined time is preferably a time less than 10 minutes, more preferably a time less than 5 minutes, and most preferably a time less than 3 minutes.

A case in which a user performs a calling operation after an impact has been detected is assumed, but since an impact may be detected after a user has performed a calling operation, the following routine may be performed. When a user performs a calling operation, the operation detecting unit 108 detects the calling operation and stores a time at which the calling operation has been detected in the storage unit 110. Thereafter, when an impact is detected, the impact detecting unit 104 stores a time at which the impact has been detected in the storage unit 110. When a result of detection of the calling operation output from the operation detecting unit 108 is acquired, the connection processing unit 107c compares the time at which the calling operation has been detected and the time at which the impact has been detected which are stored in the storage unit 110. When a difference between the time at which the calling operation has been detected and the time at which the impact has been detected is less than a predetermined time, the connection processing unit 107c prepares a connection request with the first priority when a big impact has been detected and the second priority when an intermediate impact has been detected. The predetermined time is preferably a time less than 1 minute and more preferably a time less than 10 seconds.

Figure 16:
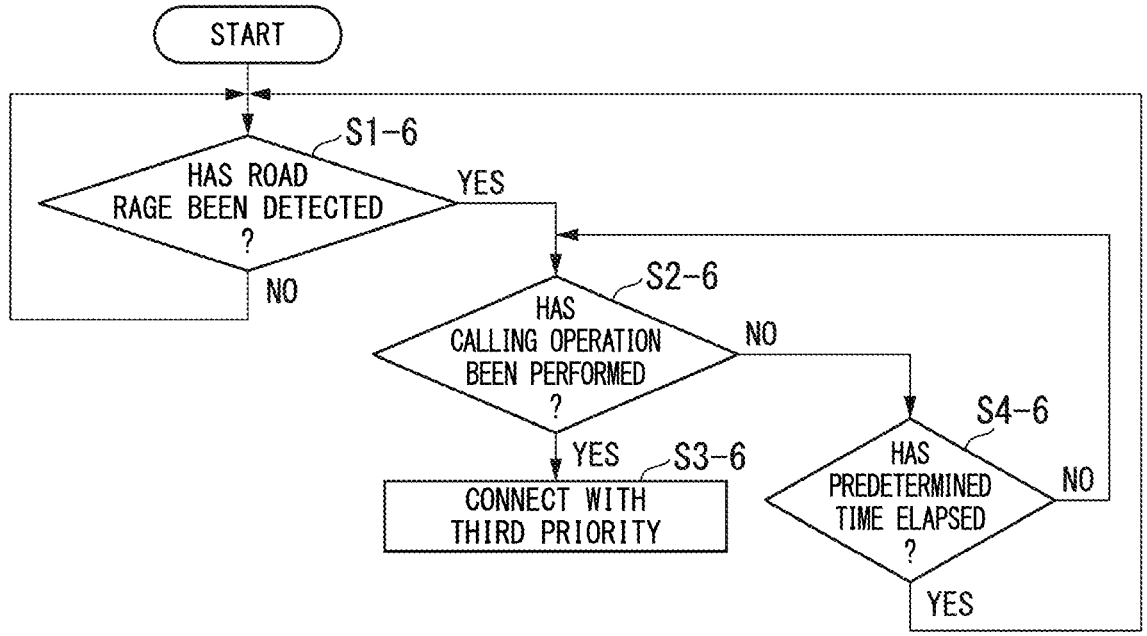
FIG. 16 is a flowchart illustrating Example 2 of the operation of the information processing system according to the second embodiment.

FIG. 16 is a flowchart illustrating Example 2 of the operation of the information processing system according to this embodiment. An example of the operation of the in-vehicle imaging device 100c is mainly illustrated in FIG. 16. FIG. 16 illustrates the operation when the in-vehicle imaging device 100 detects a vehicle near a vehicle 50c.

Step S1-6

In the in-vehicle imaging device 100c, the imaging unit 102 outputs image data to the nearby vehicle detecting unit 106. The nearby vehicle detecting unit 106 acquires the image data output from the imaging unit 102 and detects a vehicle near the vehicle 50c by processing the acquired image data. The nearby vehicle detecting unit 106 determines whether the nearby vehicle corresponds to a road-rage vehicle. When the nearby vehicle does not correspond to a road-rage vehicle, the routine returns to Step S1-6.

Step S2-6

In the in-vehicle imaging device 100c, when it is determined that the nearby vehicle corresponds to a road-rage vehicle, the nearby vehicle detecting unit 106 prepares dangerous vehicle detection information including information indicating that a vehicle corresponding to a road-rage vehicle has been detected. The nearby vehicle detecting unit 106 outputs the prepared dangerous vehicle detection information to the connection processing unit 107c. The connection processing unit 107c acquires the dangerous vehicle detection information output from the nearby vehicle detecting unit 106. The connection processing unit 107c determines whether a result of detection of a connecting operation is acquired from the operation detecting unit 108.

Step S3-6 in the in-vehicle imaging device 100c, when the result of detection of a connecting operation has been acquired from the operation detecting unit 108, the connection processing unit 107c prepares a connection request with the third priority on the basis of the acquired result of detection of a connecting operation. The connection processing unit 107c outputs the prepared connection request to the communication unit 101. The communication unit 101 acquires the connection request output from the connection processing unit 107c and transmits the acquired connection request to the call center 200.

Step S4-6

In the in-vehicle imaging device 100c, when the result of detection of a connecting operation has not been acquired from the operation detecting unit 108, the connection processing unit 107c determines whether a predetermined time has elapsed. The routine proceeds to Step S1-6 when the connection processing unit 107c determines that the predetermined time has elapsed, and the routine proceeds to Step S2-6 when it is determined that the predetermined time has not elapsed. The predetermined time is preferably a time less than 10 minutes, more preferably a time less than 5 minutes, and most preferably a time less than 3 minutes.

A case in which a user performs a calling operation after road rage has been detected is assumed, but since road rage may be detected after a user has performed a calling operation. Specifically, a case in which another vehicle is being road-raged and then the host vehicle is likely to be road-raged is conceivable. For example, a road-rage vehicle traveling at an inter-vehicle distance less than a predetermined distance may be present in vehicles near the vehicle 50c included in the image data output from the imaging unit 102. In this case, the following routine may be performed. When a user performs a calling operation, the operation detecting unit 108 detects the calling operation and stores a time at which the calling operation has been detected in the storage unit 110. Thereafter, the nearby vehicle detecting unit 106 detects road rage and stores a time at which the road rage has been detected in the storage unit 110. When a result of detection of the calling operation output from the operation detecting unit 108 is acquired, the connection processing unit 107c compares the time at which the calling operation has been detected and the time at which the road rage has been detected which are stored in the storage unit 110. When a difference between the time at which the calling operation has been detected and the time at which the road rage has been detected is less than a predetermined time, the connection processing unit 107c prepares a connection request with the third priority. The connection processing unit 107c outputs the prepared connection request to the communication unit 101. The communication unit 101 acquires the connection request output from the connection processing unit 107c and transmits the acquired connection request to the call center 200. The predetermined time is preferably a time less than 10 minutes, more preferably a time less than 5 minutes, and most preferably a time less than 3 minutes.

In the aforementioned embodiment, a case in which the connection processing unit 107c of the in-vehicle imaging device 100c connects to the call center 200 which is a phone contact with the set priority when the operation detecting unit 108 has detected an operation of connecting to the phone contact is assumed, but the present invention is not limited to this example. Specifically, when an emergency button of the in-vehicle imaging device 100c is pressed, a notification is transmitted to the call center with the set priority. The call center makes a call to the in-vehicle imaging device 100c having transmitted the notification and connects to the in-vehicle imaging device 100c. At this time, the call center may respond to the in-vehicle imaging device 100c having transmitted the notification by pushing an emergency button or a call button of a touch panel like answering a phone call or may connect thereto without such an operation.

In the aforementioned embodiment, a case in which the in-vehicle imaging device 100c connects the call center with three types of priorities is assumed, but the present invention is not limited thereto. For example, the in-vehicle imaging device 100c may connect to the call center with four or more types of priorities. Specifically, the in-vehicle imaging device 100c may determine whether the vehicle 50c has been traveling near a destination set by a car navigation system (not illustrated) for a predetermined time or more or whether the vehicle 50c has stopped near the destination for a predetermined time or more. When it is determined that the vehicle 50c has been traveling near the destination for the predetermined time or more or that the vehicle 50c has stopped near the destination for the predetermined time or more, the in-vehicle imaging device 100c may connect to the call center with a predetermined priority, for example, a fourth priority, other than the first priority, the second priority, and the third priority. The in-vehicle imaging device 100c may connect to the call center with the fourth priority when a connecting operation is detected.

Figure 17:
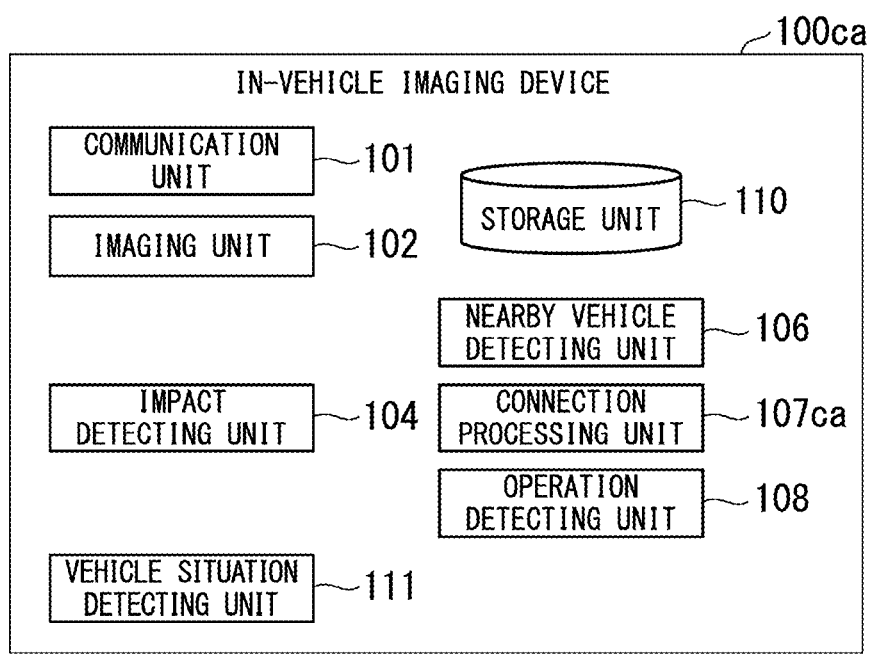
FIG. 17 is a diagram illustrating Example 1 of another configuration of the in-vehicle imaging device according to the second embodiment.

FIG. 17 is a diagram illustrating Example 1 of another configuration of the in-vehicle imaging device according to this embodiment.

The in-vehicle imaging device 100ca includes a communication unit 101, an imaging unit 102, an impact detecting unit 104, a nearby vehicle detecting unit 106, a connection processing unit 107ca, an operation detecting unit 108, a storage unit 110, and a vehicle situation detecting unit 1i1.

The vehicle situation detecting unit 111 detects that the vehicle 50c has been traveling near a destination set by a car navigation system (not illustrated) for a predetermined time or more or the vehicle 50c has stopped near the destination for a predetermined time or more. When it is detected that the vehicle 50c has been traveling near the destination for the predetermined time or more or that the vehicle 50c has stopped near the destination for the predetermined time or more, the vehicle situation detecting unit 111 prepares vehicle situation information including information indicating that the vehicle 50c has been traveling near the destination for the predetermined time or more or information indicating that the vehicle 50c has stopped near the destination for the predetermined time or more. The vehicle situation detecting unit 111 outputs the prepared vehicle situation information to the connection processing unit 107ca. The vehicle situation detecting unit 111 acquires information required for the processing from the car navigation system (not illustrated).

The connection processing unit 107ca can employ the connection processing unit 107c. Here, when the vehicle situation information output from the vehicle situation detecting unit 111 is acquired and then a result of detection of a connecting operation is acquired from the operation detecting unit 108, the connection processing unit 107ca prepares a connection request with the fourth priority. The connection processing unit 107ca outputs the prepared connection request to the communication unit 101.

The in-vehicle imaging device 100ca may determine whether the vehicle 50c is positioned in a specific location and determine whether a specific object is present near the vehicle 50c. When it is determined that the vehicle 50c is positioned in a specific location or it is determined that a specific object is present near the vehicle 50c, the in-vehicle imaging device 100ca may connect to the call center with a predetermined priority, for example, a fifth priority, other than the first priority, the second priority, the third priority, and the fourth priority. The in-vehicle imaging device 100ca may connect to the call center with the fifth priority when a connecting operation is detected.

Figure 18:
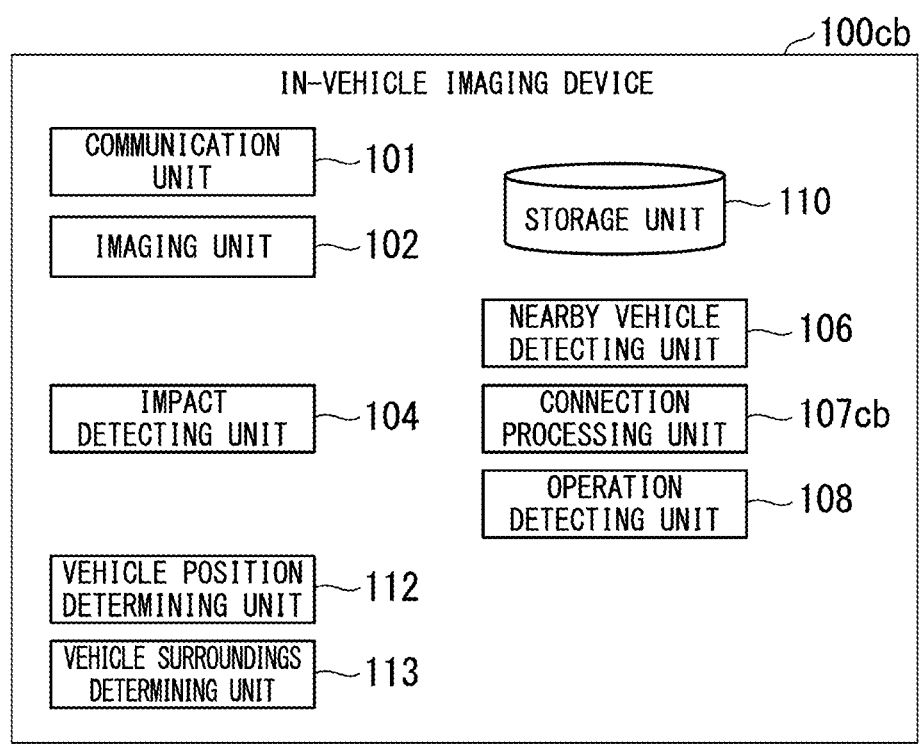
FIG. 18 is a diagram illustrating Example 2 of another configuration of the in-vehicle imaging device according to the second embodiment.

FIG. 18 is a diagram illustrating Example 2 of another configuration of the in-vehicle imaging device according to this embodiment.

The in-vehicle imaging device 100cb includes a communication unit 101, an imaging unit 102, an impact detecting unit 104, a nearby vehicle detecting unit 106, a connection processing unit 107cb, an operation detecting unit 108, a storage unit 110, a vehicle position determining unit 112, and a vehicle surroundings determining unit 113.

The vehicle position determining unit 112 determines whether the vehicle 50c is positioned in a specific location. For example, the vehicle position determining unit 112 acquires position information of the vehicle 50c from the car navigation system (not illustrated) and determines whether the position of the vehicle 50c corresponds to a preset specific location on the basis of the acquired position information of the vehicle 50c. When it is determined that the position of the vehicle 50c corresponds to the specific location, the vehicle position determining unit 112 prepares information indicating that the position of the vehicle 50c corresponds to the specific location and outputs the prepared information to the connection processing unit 107cb.

The vehicle surroundings determining unit 113 acquires the position of the vehicle 50c from the vehicle position determining unit 112, acquires a position of a destination from the car navigation system (not illustrated), and determines whether a specific object is present in a specific range of the image data output from the imaging unit 102. When it is determined that a specific object is present, the vehicle surroundings determining unit 113 prepares information indicating that a specific object is present near the vehicle 50c and outputs the prepared information to the connection processing unit 107cb.

The connection processing unit 107cb can employ the connection processing unit 107c. Here, when information indicating that the position of the vehicle 50c corresponds to a specific location has been acquired from the vehicle position determining unit 112 or information indicating that a specific object is present near the vehicle 50c has been acquired from the vehicle surroundings determining unit 113 and then a result of detection of a connecting operation is acquired from the operation detecting unit 108, the connection processing unit 107ca prepares a connection request with the fifth priority. The connection processing unit 107ca outputs the prepared connection request to the communication unit 101.

With the information processing system 1c according to this embodiment, the in-vehicle imaging device 100c includes the impact detecting unit 104 that detects an impact on the vehicle 50c, the connection processing unit 107c that connects to the phone contact with the first priority when the impact detected by the impact detecting unit 104 is equal to or greater than a predetermined magnitude and connects to the phone contact with the second priority when the impact is less than the predetermined magnitude, and the operation detecting unit 108 that detects a user's operation. The connection processing unit 107c connects to the phone contact with the second priority when the operation detecting unit 108 detects an operation for connecting to the phone contact.

With this configuration, the in-vehicle imaging device 100c can connect to an insurance company when an accident has occurred and also automatically connect to the phone contact with the first priority when an accident is reliably considered to have occurred such as when the impact on the vehicle 50c is equal to or greater than the predetermined magnitude. The in-vehicle imaging device 100c can connect to the phone contact with the second priority when the impact has a small magnitude such as when the impact is less than the predetermined magnitude and when an operation for connecting to the phone contact such as pressing of a call button is detected or when a request from the phone contact is acquired.

The in-vehicle imaging device 100cb further includes the vehicle position determining unit 112 determining whether the vehicle 50c is positioned in a specific location and the vehicle surroundings determining unit 113 determining whether a specific object is present near the vehicle 50c. When either the vehicle position determining unit 112 determines that the vehicle 50c is positioned in a specific location or the vehicle surroundings determining unit 113 determines that a specific object is present near the vehicle 50c and the operation detecting unit 108 either detects a connecting operation to the phone contact or acquires a request from the fifth phone contact, the connection processing unit 107cb connects to the phone contact with the fifth priority.

With this configuration, when it is determined that there is a specific location such as a railroad crossing, tracks of a tramcar, a crossing, or a highway or a specific object such as a railroad crossing, tracks of a tramcar, a crossing, or a highway, it is conceivable that there be a high likelihood that an accident will occur. Accordingly, the in-vehicle imaging device 100cb can connect to the phone contact with the fifth priority when a connecting operation to the phone contact is detected.

The in-vehicle imaging device 100c may further include the nearby vehicle detecting unit 106 that detects a road-rage vehicle traveling at an inter-vehicle distance less than a predetermined distance near the vehicle 50c for a predetermined time or more. When the nearby vehicle detecting unit 106 detects a road-rage vehicle and the operation detecting unit 108 either detects an operation for connecting to the phone contact or acquires a request from the phone contact, the connection processing unit 107c may connect to the phone contact with the third priority.

With this configuration, the in-vehicle imaging device 100c can connect to the phone contact with the third priority when a road-rage vehicle is detected and when an operation for connecting to the phone contact such as pressing of a call button is detected or a request from the phone contact is acquired. Here, the in-vehicle imaging device 100c may connect to the police when a road-rage vehicle is detected. When a vehicle of an assailant is a vehicle including a company name or the like, the in-vehicle imaging device 100c may connect to the corresponding company.

With the information processing system 1c according to this embodiment, the in-vehicle imaging device 100ca further includes the vehicle situation detecting unit 111 detecting that the vehicle 50c has been traveling near the destination set by the car navigation system for the predetermined time or more or that the vehicle 50c has stopped near the destination for the predetermined time or more in the in-vehicle imaging device 100c. When the vehicle situation detecting unit 111 detects either that the vehicle 50c has been traveling near the destination for the predetermined time or more or that the vehicle 50c has stopped near the destination for the predetermined time or more and the operation detecting unit 108 either detects an operation of connecting to a phone contact or acquires a request from the phone contact, the connection processing unit 107ca connects to the phone contact with the fourth priority.

With this configuration, for example, when another vehicle stops in a parking lot of the host vehicle and thus the vehicle 50c has been traveling near the destination set by the car navigation system for the predetermined time or more or the vehicle 50c has stopped near the destination for the predetermined time or more, the in-vehicle imaging device 100ca can connect to the phone contact with the fourth priority when a connecting operation to the phone contact is detected.

While embodiments of the present invention have been described above in detail with reference to the drawings, a specific configuration of the present invention is not limited to the embodiments and the present invention includes modification in design without departing from the gist of the present invention.

A computer program for realizing the functions of the aforementioned devices may be recorded on a computer-readable recording medium, and the computer program recorded on the recording medium may be read and executed by a computer system. The "computer system" mentioned herein may include an operating system (OS) or hardware such as peripherals.

Examples of the "computer-readable recording medium" include a nonvolatile memory such as a flexible disk, a magneto-optical disc, a ROM, or a flash memory, a portable medium such as a digital versatile disc (DVD), and a storage device such as a hard disk incorporated into a computer system.

The "computer-readable recording medium" may include a medium that holds a program for a predetermined time such as a volatile memory (for example, a dynamic random-access memory (DRAM)) in a computer system serving as a server or a client when a computer program is transmitted via a network such as the Internet or a communication line such as a telephone line.

The program may be transmitted from a computer system storing the program in a storage device or the like to another computer system via a transmission medium or using carrier waves in the transmission medium. The "transmission medium" for transmitting a program is a medium having a function of transmitting information such as a network (a communication network) such as the Internet or a communication circuit (a communication line) such as a telephone circuit.

The program may be a program for realizing some of the aforementioned functions.

The program may be a so-called differential file (a differential program) which can realize the aforementioned functions in combination with another program stored in advance in the computer system.

The present disclosure contributes to realization of "to make a base of industrial and technical innovation" in the SDGs and includes details contributing to value creation using IoT solutions.

INDUSTRIAL APPLICABILITY

The embodiments are applicable to an in-vehicle imaging device.

REFERENCE SIGNS LIST 1, 1a, 1b, 1c Information processing system
50, 50a, 50b. 50c Vehicle
100, 100a, 100aa, 100b, 100ba, 100bb, 100c, 100ca, 100cb In-vehicle imaging device 101 Communication unit
102 Imaging unit
104, 104a, 104b, 104ba, 104bb Impact detecting unit
105, 105a, 105aa Switching unit
106, 106a, 106b, 106ba, 106bb Nearby vehicle detecting unit
107, 107c, 107ca, 107cb Connection processing unit
108 Operation detecting unit
109, 109b, 109ba, 109bb Preparation unit
110 Storage unit
111 Vehicle situation detecting unit
112 Vehicle position determining unit
113 Vehicle surroundings determining unit
200 Call center
300 Relay server
301-1 First communication unit
301-2 Second communication unit
307 Connection processing unit
310 Storage unit

What is claimed is:

1. An in-vehicle imaging device comprising:
an impact detecting unit configured to detect an impact on a vehicle;
an operation detecting unit configured to detect a user's operation; and
a connection processing unit configured to connect to a first phone contact when the impact detected by the impact detecting unit is equal to or greater than a predetermined magnitude even if the operation detecting unit does not detect the user's operation to connect to a phone contact and to set a second phone contact as a destination of a connection when the impact is less than the predetermined magnitude and the operation detecting unit detect the user's operation to connect to a phone contact.

2. The in-vehicle imaging device according to claim 1, wherein, when the impact detecting unit detects the impact within a predetermined time after the operation for connecting to a phone contact has been performed, the connection processing unit connects to the first phone contact when the impact is equal to or greater than the predetermined magnitude and connects to the second phone contact when the impact is less than the predetermined magnitude.

3. The in-vehicle imaging device according to claim 1, further comprising a nearby vehicle detecting unit configured to detect a road-rage vehicle traveling near the vehicle with an inter-vehicle distance less than a predetermined distance for a predetermined time or more,
wherein the connection processing unit connects to a third phone contact when the nearby vehicle detecting unit detects a road-rage vehicle and the operation detecting unit either detects the operation for connecting to a phone contact or acquires a request from the third phone contact.

4. The in-vehicle imaging device according to claim 3, wherein the connection processing unit connects to a third phone contact when the nearby vehicle detecting unit detects a road-rage within a predetermined time after the operation for connecting to a phone contact has been performed.

5. The in-vehicle imaging device according to claim 1, further comprising a vehicle situation detecting unit configured to detect that the vehicle has been traveling near a destination set by a car navigation system for a predetermined time or more or the vehicle has stopped near the destination for a predetermined time or more,
wherein the connection processing unit connects to a fourth phone contact when the vehicle situation detecting unit detects either that the vehicle has been traveling near the destination for a predetermined time or more or that the vehicle has stopped near the destination for a predetermined time or more and the operation detecting unit either detects the operation for connecting to a phone contact or acquires a request from the fourth phone contact.

6. The in-vehicle imaging device according to claim 1, further comprising:
a vehicle position determining unit configured to determine whether a position of the vehicle is in a specific location; and
a vehicle surroundings determining unit configured to determine whether a specific object is present near the vehicle,
wherein the connection processing unit connects to a fifth phone contact when either the vehicle position determining unit determines that the position of the vehicle is in a specific location or the vehicle surroundings determining unit determines that a specific object is present near the vehicle and the operation detecting unit either detects the operation for connecting to a phone contact or acquires a request from the fifth phone contact.

7. A non-transitory computer-readable storage medium storing a program causing a computer to perform:
a step of detecting an impact on a vehicle; and
a step of connecting to a first phone contact when the detected impact is equal to or greater than a predetermined magnitude even if not detecting a user's operation to connect to a phone contact and connecting to a second phone contact when the impact is less than the predetermined magnitude and an operation for connecting to a phone contact has been detected.

8. An in-vehicle imaging device comprising:
an impact detecting unit configured to detect an impact on a vehicle;
an operation detecting unit configured to detect a user's operation; and
a connection processing unit configured to connects to a phone contact with a first priority when the impact detected by the impact detecting unit is equal to or greater than a predetermined magnitude even if the operation detecting unit does not detect the user's operation to connect to a phone contact and to connect to a phone contact with a second priority when the impact is less than the predetermined magnitude and the operation detecting unit detects an operation for connecting to a phone contact.

9. The in-vehicle imaging device according to claim 8, wherein, when the impact detecting unit detects the impact within a predetermined time after the operation for connecting to a phone contact has been performed, the connection processing unit connects to the phone contact with the first priority when the impact is equal to or greater than the predetermined magnitude and connects to the phone contact with the second priority when the impact is less than the predetermined magnitude.

10. The in-vehicle imaging device according to claim 8, further comprising a nearby vehicle detecting unit configured to detect a road-rage vehicle traveling near the vehicle with an inter-vehicle distance less than a predetermined distance for a predetermined time or more, wherein the connection processing unit connects to the phone contact with a third priority when the nearby vehicle detecting unit detects a road-rage vehicle and the operation detecting unit either detects the operation for connecting to a phone contact or acquires a request from the phone contact.

11. The in-vehicle imaging device according to claim 10, wherein the connection processing unit connects to the phone contact with a third priority when the nearby vehicle detecting unit detect a road-rage within a predetermined time after the operation for connecting to a phone contact has been performed.

12. The in-vehicle imaging device according to claim 8, further comprising a vehicle situation detecting unit configured to detect that the vehicle has been traveling near a destination set by a car navigation system for a predetermined time or more or the vehicle has stopped near the destination for a predetermined time or more,
   wherein the connection processing unit connects to the phone contact with a fourth priority when the vehicle situation detecting unit detects either that the vehicle has been traveling near the destination for a predetermined time or more or that the vehicle has stopped near the destination for a predetermined time or more and the operation detecting unit either detects the operation for connecting to a phone contact or acquires a request from the phone contact.

13. The in-vehicle imaging device according to claim 8, further comprising:
   a vehicle position determining unit configured to determine whether a position of the vehicle is in a specific location; and
   a vehicle surroundings determining unit configured to determine whether a specific object is present near the vehicle,
   wherein the connection processing unit connects to the phone contact with a fifth priority when either the vehicle position determining unit determines that the position of the vehicle is in a specific location or the vehicle surroundings determining unit determines that a specific object is present near the vehicle and the operation detecting unit either detects the operation for connecting to a phone contact or acquires a request from the phone contact.

14. A non-transitory computer-readable storage medium storing a program causing a computer to perform:
   a step of detecting an impact on a vehicle; and
   a step of connecting to a phone contact with a first priority when the detected impact is equal to or greater than a predetermined magnitude even if not detecting a user's operation to connect to a phone contact and connecting to the phone contact with a second priority when the impact is less than the predetermined magnitude and an operation for connecting to a phone contact has been detected.

* * * * *